US011223495B2

(12) United States Patent
Inoue et al.

(10) Patent No.: US 11,223,495 B2
(45) Date of Patent: Jan. 11, 2022

(54) TRANSFER DEVICE, TRANSFER METHOD, AND TRANSFER SYSTEM

(71) Applicant: MITSUBISHI ELECTRIC CORPORATION, Tokyo (JP)

(72) Inventors: Ayako Inoue, Tokyo (JP); Sachiko Taniguchi, Tokyo (JP); Yusuke Sakagami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/479,846

(22) PCT Filed: Mar. 6, 2017

(86) PCT No.: PCT/JP2017/008660
§ 371 (c)(1),
(2) Date: Jul. 22, 2019

(87) PCT Pub. No.: WO2018/163229
PCT Pub. Date: Sep. 13, 2018

(65) Prior Publication Data
US 2020/0280457 A1 Sep. 3, 2020

(51) Int. Cl.
*H04L 12/28* (2006.01)
*H04L 12/851* (2013.01)
(Continued)

(52) U.S. Cl.
CPC .......... *H04L 12/28* (2013.01); *H04L 47/2483* (2013.01); *H04L 49/251* (2013.01); *H04L 49/252* (2013.01); *H04L 49/30* (2013.01)

(58) Field of Classification Search
CPC ... H04L 12/28; H04L 47/2483; H04L 49/251; H04L 49/252; H04L 49/30
(Continued)

(56) References Cited

U.S. PATENT DOCUMENTS 6,185,203 B1 * 2/2001 Berman .................. H04L 49/30
370/351
6,956,867 B1 10/2005 Suga
(Continued)

FOREIGN PATENT DOCUMENTS

CN         105191235 A    12/2015
JP         2001-53805 A    2/2001
(Continued)

OTHER PUBLICATIONS

Author Unknown, "Applying QoS on Cisco Switches," Sep. 25, 2008, URL:https://netmemo.tistory.com/entry/Cisco-Switch%EC%97%90%EC%84%9C-QoS-%EC%A0%81%EC%9A%A9%ED%95%98%EA%B8%B0, 31 pages.
(Continued)

*Primary Examiner* — Christopher R Crompton
(74) *Attorney, Agent, or Firm* — Birch, Stewart, Kolasch & Birch, LLP

(57) ABSTRACT

A transfer device includes an output-port decision unit to decide, on the basis of storage information stored in a frame input, an output port from which the frame is output from among a plurality of ports, an allocation unit to associate an input port to which the frame is input with an output port from which a frame which is transferred by a cut-through method is output on a one-to-one basis, and allocate a first frame to a first pathway transferring by the cut-through method and allocate a second frame to a second pathway transferring by a store-and-forward method on the basis of type information of an input port to which a frame has been input, class information of the frame, and the output port decided by the output-port decision unit, and an IET-output control unit to output the first frame from the output port, decide whether to divide the second frame on the basis of the class information of the second frame, and output the second frame from the output port on the basis of decision. There-
(Continued)

fore, the transfer device can realize an IET low-latency transfer function by control simpler than that in the conventional transfer devices.

6 Claims, 20 Drawing Sheets

(51) Int. Cl.
*H04L 12/947* (2013.01)
*H04L 12/935* (2013.01)

(58) Field of Classification Search
USPC .......................................... 370/392
See application file for complete search history.

(56) References Cited

U.S. PATENT DOCUMENTS

| | | | | |
|---|---|---|---|---|
| 2002/0118692 | A1* | 8/2002 | Oberman | H04L 12/5601 370/419 |
| 2004/0114516 | A1 | 6/2004 | Iwata et al. | |
| 2005/0018638 | A1* | 1/2005 | Lindskog | H04W 52/0296 370/338 |
| 2013/0322244 | A1 | 12/2013 | Matthews | |
| 2014/0269688 | A1* | 9/2014 | Alsup | G06F 9/5044 370/386 |
| 2014/0286351 | A1 | 9/2014 | Turgeman et al. | |
| 2014/0286352 | A1* | 9/2014 | Turgeman | H04L 49/252 370/429 |
| 2015/0163729 | A1* | 6/2015 | Seo | H04B 7/2656 370/336 |
| 2015/0229577 | A1* | 8/2015 | Baratam | H04L 49/251 370/415 |
| 2015/0312160 | A1* | 10/2015 | Griswold | H04L 49/351 370/412 |
| 2015/0365338 | A1* | 12/2015 | Pannell | H04L 49/253 370/412 |
| 2015/0381492 | A1* | 12/2015 | Kamble | H04L 49/354 370/392 |
| 2016/0173395 | A1* | 6/2016 | Danielsson | H04L 47/28 370/236 |
| 2016/0226797 | A1* | 8/2016 | Aravinthan | H04L 49/251 |
| 2017/0187589 | A1* | 6/2017 | Pope | H04L 1/0082 |
| 2018/0176091 | A1* | 6/2018 | Yoon | H04L 41/0896 |
| 2019/0319865 | A1* | 10/2019 | Inoue | H04L 43/0823 |
| 2019/0373086 | A1* | 12/2019 | Qi | H04L 69/166 |

FOREIGN PATENT DOCUMENTS

| | | |
|---|---|---|
| JP | 2002-16637 A | 1/2002 |
| JP | 2003-338844 A | 11/2003 |
| JP | 2016-103700 A | 6/2016 |
| WO | WO 2016/132402 A1 | 8/2016 |

OTHER PUBLICATIONS

Korean Office Action for Korean Application No. 10-2019-7025346, dated Feb. 24, 2020, with English translation.
IEEE Standard for Ethernet, Amendment 5: Specification and Management Parameters for Interspersing Express Traffic; IEEE Computer Society; IEEE Std 802.3br-2016; Jun. 30, 2016.
Office Action issued in corresponding Korean Application No. 10-2019-7025346 dated Oct. 28, 2019.
Inoue et al., "A Prototype Evaluation of Low Latency Ethernet Switch with Frame Preemption", The Institute of Electronics, Information and Communication Engineers, Society Conference 2015, Total 2 pages.
Inoue et al., "A Prototype Evaluation of Low Latency Ethernet Switch with Frame Preemption", The Institute of Electronics, Information and Communication Engineers, Technical Report, 2015, pp. 69-74.
International Search Report (PCT/ISA/210) issued in PCT/JP2017/008660, dated May 30, 2017.
Japan Office Acton for application No. 2019-503823 dated Apr. 23, 2019.
Office Action issued in corresponding Chinese Application No. 201780087648.9 dated Feb. 25, 2021.
Office Action issued in corresponding Indian Application No. 201947032845 dated Jun. 8, 2021.

* cited by examiner

Fig.13

CLASS IDENTIFICATION BY SMD VALUE

| SMD VALUE | CLASS |
|---|---|
| SMD-E | LOW-LATENCY |
| SMD-S | GENERAL |
| SMD-C | GENERAL |

Fig.14

EXAMPLE OF CLASS TABLE DESTINATION IP ADDRESS

| DESTINATION IP ADDRESS | CLASS |
|---|---|
| AA. AA. AA. AA | LOW-LATENCY |
| CC. CC. CC. CC | GENERAL |
| ... | ... |
| ZZ. ZZ. ZZ. ZZ | GENERAL |

Fig.15

INPUT PORT FOR OUTPUT PORT PERFORMING CUT-THROUGH

| INPUT PORT | OUTPUT PORT BITMAP | | | |
|---|---|---|---|---|
| | PORT 104 | PORT 103 | PORT 102 | PORT 101 |
| PORT 101 | 0 | 0 | 1 | 0 |
| PORT 102 | 0 | 0 | 0 | 1 |
| PORT 103 | 0 | 0 | 0 | 0 |
| PORT 104 | 0 | 0 | 0 | 0 |

TRANSFER DEVICE, TRANSFER METHOD, AND TRANSFER SYSTEM

TECHNICAL FIELD

The present invention relates to a transfer device, a transfer method, and a transfer system including a plurality of ports and transferring a received frame.

BACKGROUND ART

Frames to be transferred in an industrial Ethernet (registered trademark) network include frames that require low-latency transfer and frames that allow for transfer latency. For example, strict latency requirements are sometimes imposed on control-related frames that handle control data for devices to realize a high speed and a high reliability. Latency is often more permissible to information-related frames other than the control-related frames, which handle data such as video data, audio data, or user data as compared to the control-related frames while latency requirements differ according to traffic types. In the following descriptions, frames that require low-latency transfer such as the control-related frames are described as frames of a low-latency class. Meanwhile, frames that have relatively less-strict latency requirements and allow for latency transfer as compared to frames of the low-latency class are described as frames of a general class. The frames of the low-latency class need to be transferred in priority to the frames of the general class.

A cut-through method is conventionally used as a method for transferring frames with low latency. The cut-through method transfers data of one frame without temporarily storing the data and therefore can transfer the data with lower latency relative to a store-and-forward method being a transfer method of a general multiplexer. In a case where frames of the low-latency class are to be transferred in priority to frames of the general class, for example, a transfer device of Non Patent Literature 1 includes MAC (Media Access Control) to which an IET (Interspersing Express Traffic) technique that enables to reduce a transfer latency time of frames of the low-latency class by performing interrupt transfer defined as a standard by IEEE 802.3 br is applied. The transfer device of Non Patent Literature 1 includes cut-through storage units as many as input ports for each output port, where the cut-through storage units perform transfer by the cut-through method of suppressing latency to transfer frames of the low-latency class with low latency. When there is a request for transfer of frames of the low-latency class during transfer of frames of the general class, the IET technique interrupts the transfer of the frames of the general class in a range that meets the minimum frame length of the Ethernet (registered trademark) to perform interrupt transfer of the frames of the low-latency class, and transfers the remaining part of the frames of the general class after the transfer of the frames of the low-latency class ends. The transfer device including the MAC to which the IET is applied can reduce the transfer latency time of frames of the low-latency class in this way. The IET technique is a technique particularly effective in a case where frames of the low-latency class are transferred via a plurality of transfer devices.

CITATION LIST

Non Patent Literature

Non Patent Literature 1: Ayako Inoue, Hiroshi Bessho, Yoshifumi Hotta, and Ryusuke Kawate, "A Prototype Evaluation of Low Latency Ethernet (registered trademark) Switch with Frame Preemption", The Institute of Electronics, Information and Communication Engineers, Technical Report

SUMMARY OF INVENTION

Technical Problem

However, considering a case where frames of the low-latency class are input from a plurality of input ports at the time of transfer by the cut-through method, the cut-through storage units as many as the input ports for each output port are required in the conventional transfer device described above. Since frames are read from the cut-through storage units as many as the input ports and are transmitted, there is a problem that output control on the frames is complicated.

The present invention has been achieved to solve the problem described above and an object of the present invention is to provide a transfer device, a transfer method, and a transfer system that realize an IET low-latency transfer function by control simpler than that in the conventional transfer devices.

Solution to Problem

A transfer device according to the present invention includes:

an output-port decision unit to decide, on a basis of storage information stored in a frame input, an output port from which the frame is output from among a plurality of ports;

an allocation unit to associate an input port to which the frame is input with an output port from which a frame which is transferred by a cut-through method is output on a one-to-one basis, and allocate a first frame to a first pathway transferring by the cut-through method and allocate a second frame to a second pathway transferring by a store-and-forward method on a basis of type information of an input port to which a frame has been input, class information of the frame, and the output port decided by the output-port decision unit; and an IET-output control unit to output the first frame allocated to the first pathway from the output port, decide whether to divide the second frame on a basis of the class information of the second frame allocated to the second pathway, and output the second frame from the output port on a basis of decision.

Advantageous Effects of Invention

According to the present invention, it is possible to realize an IET low-latency transfer function by control simpler than that in the conventional transfer devices.

BRIEF DESCRIPTION OF DRAWINGS

FIG. 13 is a diagram illustrating a class identification method based on an SMD value.

FIG. 14 is a diagram illustrating an example of a class table.

FIG. 15 is an example illustrating input ports for output ports that perform transfer by cut-through according to the first embodiment.

DESCRIPTION OF EMBODIMENTS

First Embodiment

Figure 1:
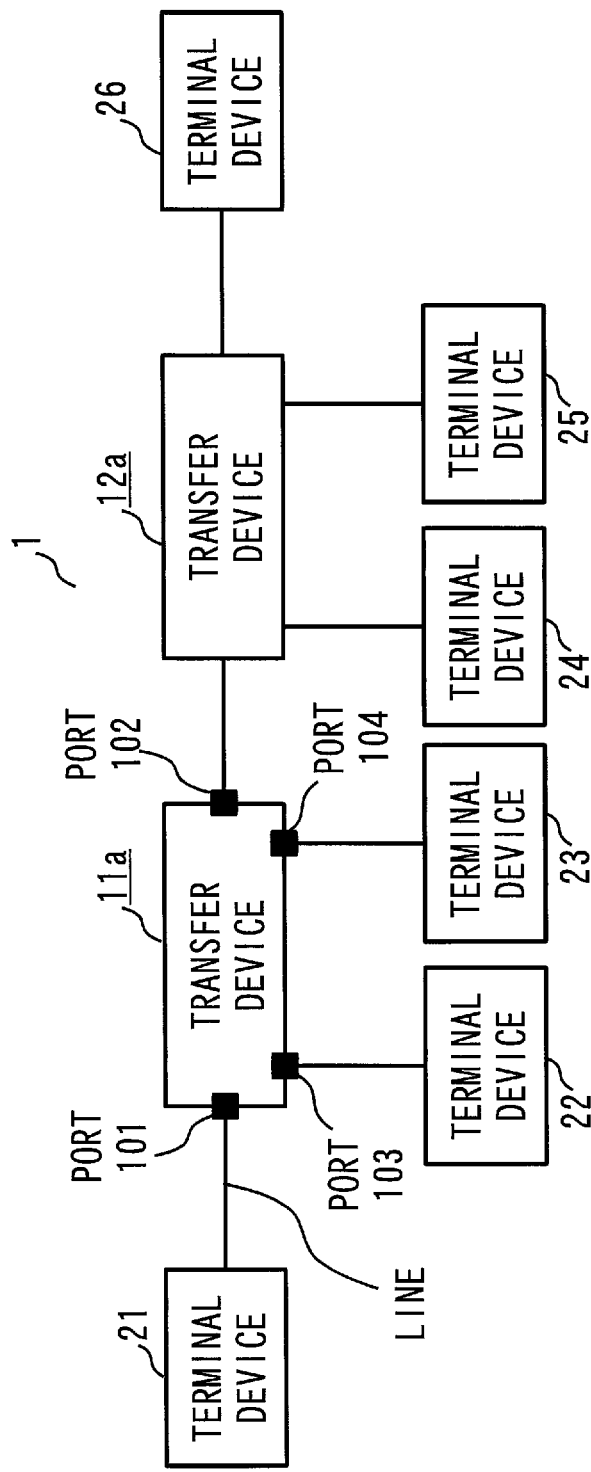
FIG. 1 is a functional block diagram of a transfer system including a transfer device according to a first embodiment of the present invention.

FIG. 1 is a functional block diagram of a transfer system 1 including a transfer device 11a according to a first embodiment of the present invention.

The transfer system 1 includes the transfer device 11a, terminal devices 21 to 23 connected to the transfer device 11a, a transfer device 12a connected to the transfer device 11a, and terminal devices 24 to 26 connected to the transfer device 12a. These devices are connected with lines.

The transfer device 11a transfers, for example, frames received from the terminal device 21 to the terminal device 22. The transfer device 11a also transfers, for example, frames received from the terminal device 21 to the transfer device 12a. The transfer device 12a is a device identical to the transfer device 11a. In the transfer device 11a of the first embodiment, the terminal device 21 is connected to a port 101, the transfer device 12a is connected to a port 102, the terminal device 22 is connected to a port 103, and the terminal device 23 is connected to a port 104. Frames can be input to or output from the ports 101 to 104.

The transfer device 11a includes MAC to which the IET technique is applied, to transfer frames of a low-latency class with low latency. The terminal devices 21 and 22 and the transfer device 12a each include MAC to which the IET technique is applied, similarly to the transfer device 11a. It is assumed that the terminal devices 23 to 26 do not include MAC to which the IET technique is applied, or do not use the IET technique while including MAC.

In the following descriptions, the cut-through method is described simply as cut-through. The store-and-forward method is described simply as store-and-forward.

The terminal device 21 in FIG. 1 transmits or receives frames to or from the transfer device 11a. The terminal device 21 is a control device, a communication device, or the like. The terminal devices 22 and 23 are identical devices to the terminal device 21.

The terminal device 24 transmits or receives frames to or from the transfer device 12a. The terminal device 24 is a control device, a communication device, or the like. The terminal device 24 has functions identical to those of the terminal device 21 while frames are transmitted to or received from a different transfer device. The terminal devices 25 and 26 are identical devices to the terminal device 24.

In the first embodiment, the terminal devices 21 to 26 handle also control-related frames and information-related frames. In the transfer device 11a, the ports 101 and 102 are ports that support the IET and are capable of transfer by cut-through. Ports that enable transfer by the IET are referred to also as relay ports. Ports other than the relay ports, which enable only transfer by store-and-forward, are also referred to as terminal ports. That is, in the transfer device 11a, the ports 101 and 102 are relay ports and the ports 103 and 104 are terminal ports.

Figure 2:
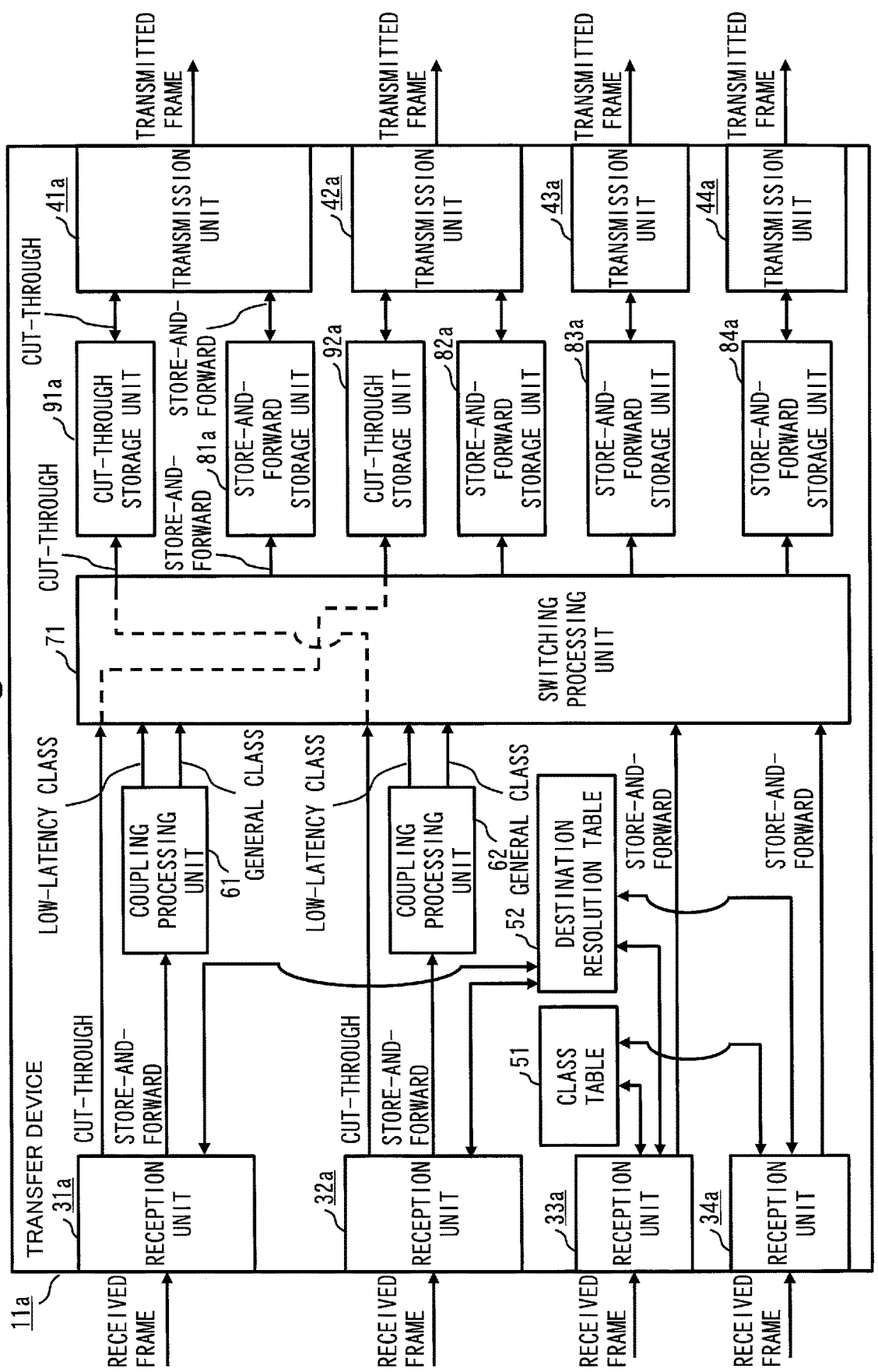
FIG. 2 is a functional block diagram of the transfer device according to the first embodiment of the present invention.

FIG. 2 is a functional block diagram of the transfer device 11a according to the first embodiment of the present invention.

The transfer device 11a includes reception units 31a to 34a, a class table 51, a destination resolution table 52, coupling processing units 61 and 62, a switching processing unit 71, store-and-forward storage units 81a to 84a, cut-through storage units 91a and 92a, and transmission units 41a to 44a. The transfer device 12a has a configuration identical to that of the transfer device 11a.

The reception unit 31a is an input port of the port 101. The reception unit 31a receives a frame from another device, identifies the priority class, searches for output ports, and decides a pathway through which the received frame is to be transferred for each of the output ports oil the basis of the input port, the priority class, and the output port information. The reception unit 31a transmits a frame to be transmitted by cut-through to a cut-through path and transmits a frame to be transmitted by store-and-forward to a store-and-forward path. In FIG. 2, a cut-through path is described as a cut-through, and a store-and-forward path is described as a store-and-forward. The reception unit 31a includes MAC to which the IET technique is applied. The reception unit 32a is identical to the reception unit 31a. However, the reception unit 32a is an input port of the port 102.

The reception unit 33a is an input port of the port 103. The reception unit 33a receives a frame from another device and decides a port to which the received frame is to be transferred. The reception unit 33a transmits the received frame to a store-and-forward path on the basis of the decided pathway. The reception unit 33a does not need to include MAC to which the IET technique is applied. The reception unit 34a is identical to the reception unit 33a. However, the reception unit 34a is an input port of the port 104. Details of the reception units 31a to 34a are described later. The reception unit is provided for each port.

The class table 51 is a table that associates storage information in received frames and class information of the frames with each other. The class information includes at least two classes which are a low-latency class and a general class and each of the classes can be further divided into a plurality of classes. The class table 51 is referred to by the reception units 33a and 34a. The class table 51 has been stored in the transfer device 11a in advance.

The destination resolution table 52 is a table that associates the storage information in received frames and output port information of the frames. The destination resolution table 52 is referred to by the reception units 31a to 34a. The destination resolution table 52 can be stored in the transfer device 11a in advance or can be learned by the transfer device 11a on the basis of the input ports and the storage information in the frames, and has functions identical to those of a general layer-2 switch FDB (Forwarding Database) table.

While one class table 51 and one destination resolution table 52 are provided for the transfer device 11a, each of the reception units can include the class table and the destination resolution table.

The coupling processing unit 61 identifies the classes of received frames and transfers the frames to the switching processing unit 71 through a store-and-forward path of the low-latency class and a store-and-forward path of the general class which is on a different line. The coupling processing unit 61 includes also a storage unit that temporarily stores received frames of the general class. The coupling processing unit 61 has a function to determine whether a frame of the general class has been divided and performs coupling of a received frame when determining that the received frame of the general class has been divided. When a received frame has not been divided, a coupling process is not performed. The coupling processing unit 61 may transfer a received frame of the general class and a received frame of the low-latency class through the store-and-forward path by multiplexing the received frame of the general class with the received frame of the low-latency class. When performing multiplexing, the coupling processing unit 61 includes also a storage unit that stores a frame of the low-latency class.

The coupling processing unit 62 has functions identical to those of the coupling processing unit 61.

The switching processing unit 71 performs a layer-2 switching process. Specifically, the switching processing unit 71 allocates a received frame to cut-through storage units or store-and-forward storage units connecting to transmission units being transmission destinations of the received frames on the basis of the output port information and the pathways decided by the reception units 31a to 34a. The switching processing unit 71 multiplexes frames received through the store-and-forward pathways and thereafter allocates the frames to the store-and-forward storage units being the transmission destinations.

The cut-through storage unit 91a stores therein received frames. When a frame is input thereto, the cut-through storage unit 91a outputs a transmission request to the transmission unit 41a connected thereto. The cut-through storage unit 91a transmits the frame to the transmission unit 41a when a transmission permission is issued from the transmission unit 41a.

The cut-through storage unit 92a is identical to the cut-through storage unit 91a. However, the cut-through storage unit 92a becomes the transmission unit 42a instead of the transmission unit 41a.

The store-and-forward storage unit 81a stores therein received frames. The store-and-forward storage unit 81a manages stored frames in units of priority classes in the order of inputting. When one or more frames are stored therein, the store-and-forward storage unit 81a outputs a transmission request to the transmission unit 41a connected thereto. When a transmission permission is issued from the transmission unit 41a, the store-and-forward storage unit 81a preferentially transmits frames of a higher priority class among the stored frames to the transmission unit 41a. It is assumed that the low-latency class has a priority higher than the general class. At the time of transmission of a frame, the transmission unit 41a is notified also of the class information of the frame and frame information such as the frame length. When the class information and the frame length of a frame are stored in the frame, the store-and-forward storage unit 81a starts or stops the transmission on the basis of whether there is a transmission permission from the transmission unit 41a.

The store-and-forward storage unit 82a becomes the transmission unit 42a instead of the transmission unit 41a. The store-and-forward storage unit 83a becomes the transmission unit 43a instead of the transmission unit 41a. The store-and-forward storage unit 84a becomes the transmission unit 44a instead of the transmission unit 41a. One store-and-forward storage unit is provided for each of the transmission units.

The cut-through storage units 91a and 92a store therein frames of the low-latency class. The store-and-forward storage units 81a to 84a can store therein both frames of the low-latency class and frames of the general class.

The transmission unit 41a is an output port of the port 101. The transmission unit 41a transmits received frames by cut-through or by store-and-forward. The transmission unit 41a includes MAC to which the IET technique is applied. The transmission unit 42a is identical to the transmission unit 41a. However, the transmission unit 42a is an output port of the port 102.

The transmission unit 43a is an output port of the port 103. The transmission unit 43a transmits received frames by store-and-forward. The transmission unit 43a does not need to include MAC to which the IET technique is applied. The transmission unit 44a is identical to the transmission unit 43a. However, the transmission unit 44a is an output port of the port 104. Details of the transmission units 41a to 44a are described later. The transmission unit is provided for each port.

A frame configuration is explained below.

Figure 3:
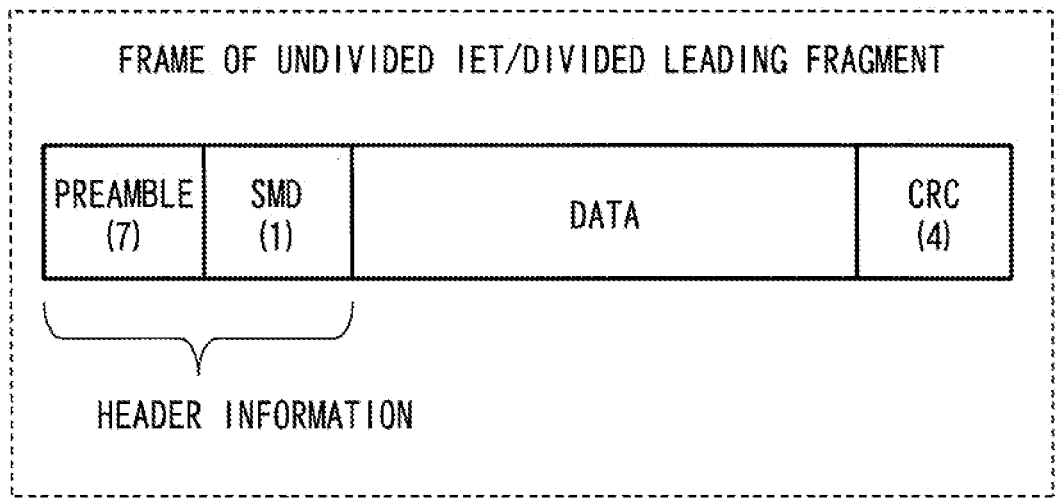
FIG. 3 is a diagram illustrating an example of an IET frame.

FIG. 3 is a diagram illustrating an example of an IET frame.

An undivided IET frame and a divided leading fragment in FIG. 3 are constituted by "preamble", "SMD (Start Mframe Delimiter) value" "data", and "CRC (Cyclic Redundancy Check)". The "data" is a general Ethernet (registered trademark) frame and various data including "destination MAC address" and "transmission source MAC address" is written therein. The "CRC" is stored in the end of the Ethernet (registered trademark) frame and the value of an FCS (Frame Check Sequence) being a value for detecting an error in contents of the frame data is stored therein. Numbers in parentheses indicate the numbers of bytes. Since this is a frame of the low-latency class, "SMD-E" is set as the "SMD value". "SMD-S" is set as the "SMD value" for an undivided frame of the general class. The leading fragment of divided frames is constituted by a frame identical to that illustrated in FIG. 3. "SMD-S" is set as the "SMD value" and an "MCRC (Mframe CRC) value" for detecting an error in the contents of data in the leading fragment and indicating division is stored in the "CRC".

Figure 4:
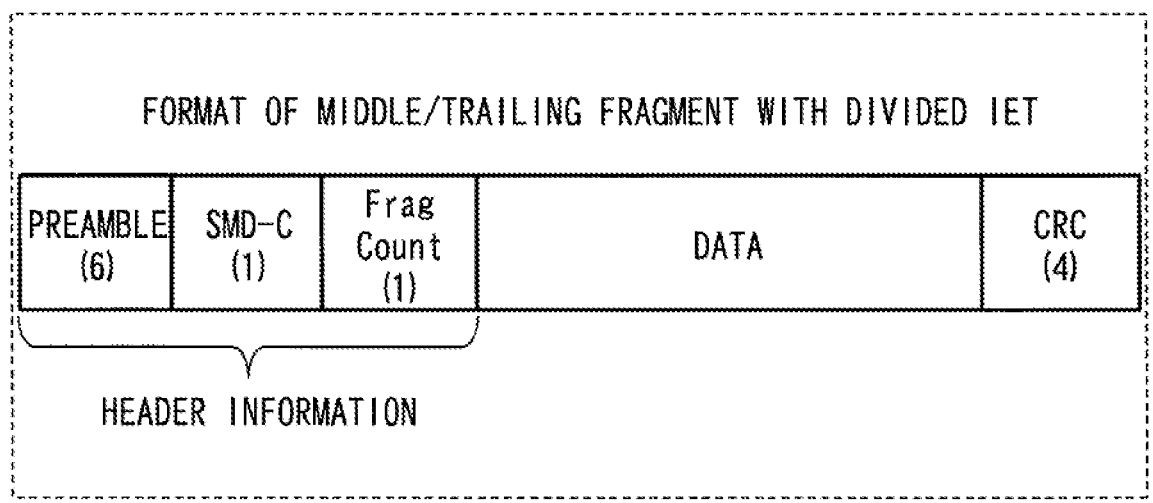
FIG. 4 is a diagram illustrating an example of a frame of middle and trailing fragments at a time when a frame is divided.

FIG. 4 is a diagram illustrating an example of a frame of middle and trailing fragments at a time when a frame is divided.

The middle and trailing fragments in FIG. 4 are constituted by "preamble", "SMD value", "Frag Count", "data", and "CRC". "SMD-C" is set as the "SMD value" in FIG. 4. The "Frag Count" is a value provided in a sequential order each time a fragment is transferred, and is a value for checking whether no fragment is missing. "MCRC" for detecting an error in the contents of data in the middle fragment and indicating division, which is identical to that in the leading fragment, is stored in the "CRC" of the middle fragment, and an "FCS" value of data corresponding to one frame being data of all divided fragments from the leading fragment is stored in the "CRC" of the trailing fragment.

Figure 5:
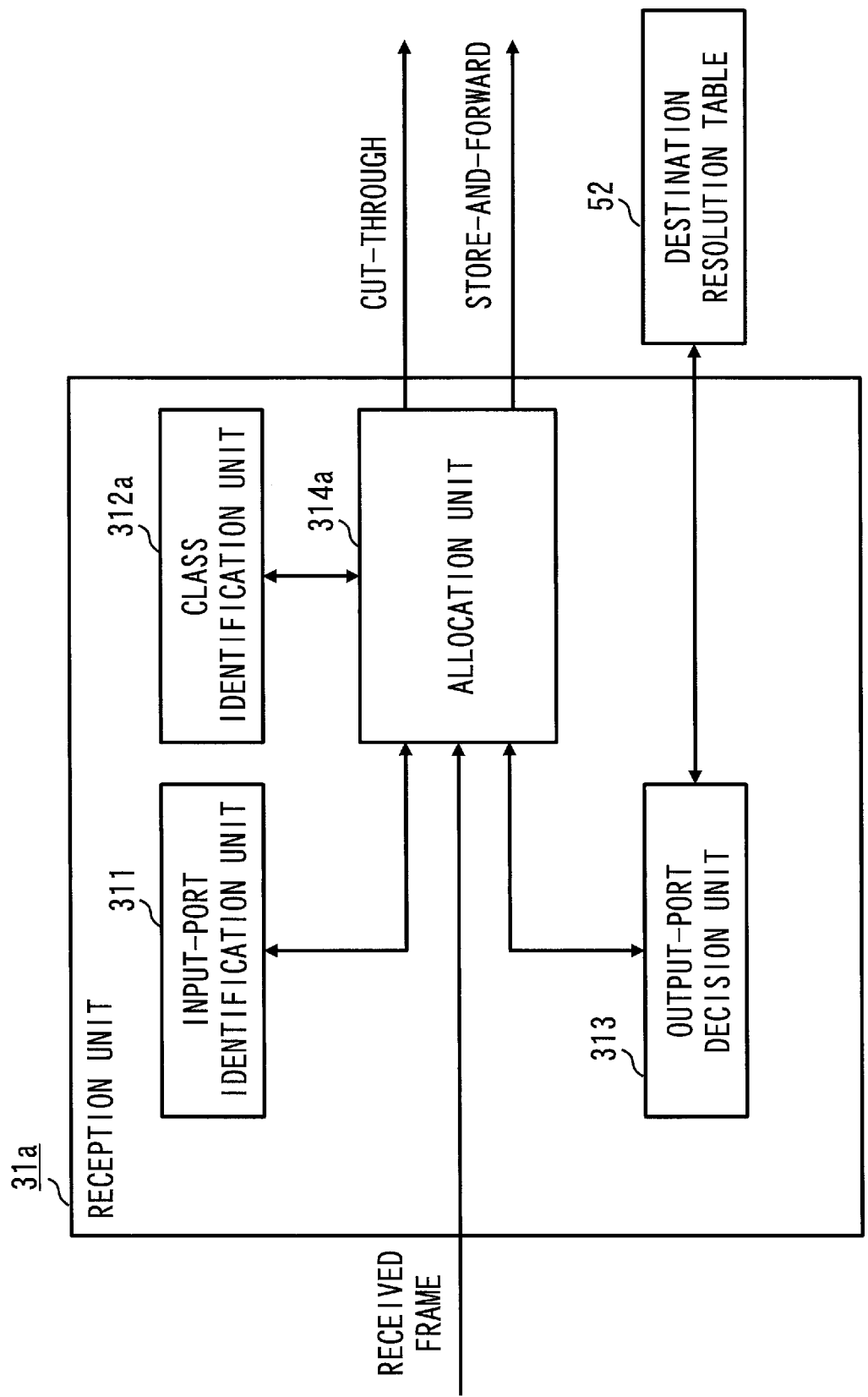
FIG. 5 is a functional block diagram of a reception unit of the transfer device according to the first embodiment of the present invention.

FIG. 5 is a functional block diagram of the reception unit 31a of the transfer device 11a according to the first embodiment of the present invention. The reception unit 31a is explained in detail with reference to FIG. 5.

The reception unit 31a includes an input-port identification unit 311, a class identification unit 312a, an output-port decision unit 313, and an allocation unit 314a.

The input-port identification unit 311 identifies type information of a port to which a frame has been input. The type information of a port is information different according to ports, such as an input port number.

The class identification unit 312a identifies the low-latency class and the general class on the basis of the SMD value stored in the header of an IET frame received from the terminal device 21 by the allocation unit 314a.

The output-port decision unit 313 refers to the destination resolution table 52 based on the storage information in a frame received from the terminal device 21 by the allocation unit 314a to decide an output port of the received frame. A plurality of output ports may be decided.

The allocation unit 314a receives a frame of the low-latency class or a frame of the general class from the terminal device 21. The allocation unit 314a allocates a frame of the low-latency class to be transferred to the transmission unit 42a to the cut-through path and allocates a frame of the low-latency class to be transferred to ports other than the transmission unit 42a and all frames of the general class to the store-and-forward path on the basis of the type information of the input port, the class information of the frame, and the output port information. Since there may be a plurality of ports to which a frame is to be transferred and whether to transfer a received frame via the cut-through pathway or the store-and-forward pathway is decided with respect to each transfer destination port, a frame of the low-latency class may be transferred to the both pathways.

When transferring a frame, the allocation unit 314a stores the class information and the output port information in the item of the "header" or the "data" of the frame.

The functional block diagram of the reception unit 32a is identical to that of the reception unit 31a. However, the allocation unit 314a receives a frame of the low-latency class or a frame of the general class from the transfer device 12a and transfers a frame of the low-latency class that is to be output to the transmission unit 41a to the cut-through path.

Figure 6:
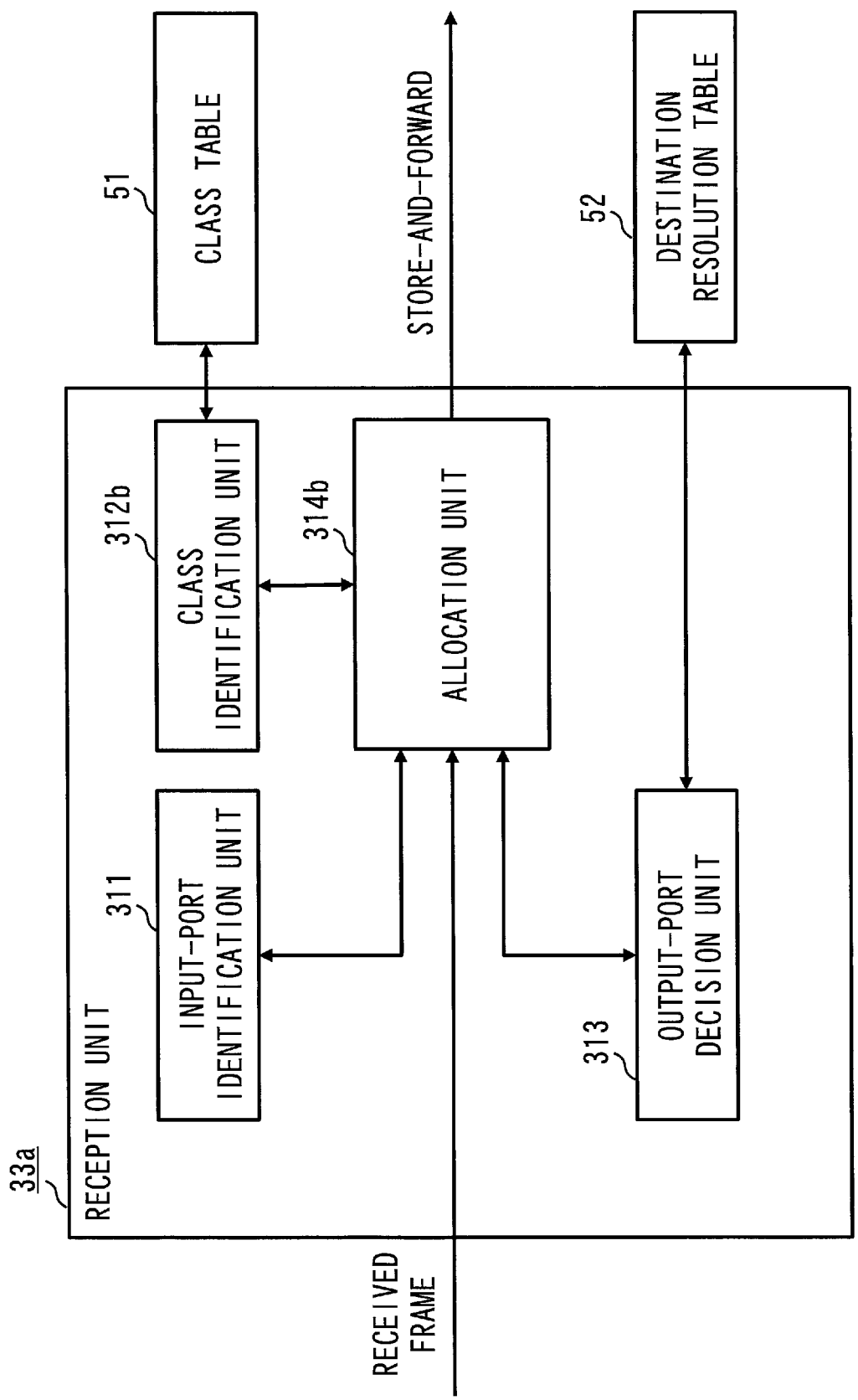
FIG. 6 is a functional block diagram of another reception unit of the transfer device according to the first embodiment of the present invention.

FIG. 6 is a functional block diagram of the reception unit 33a of the transfer device 11a according to the first embodiment of the present invention. The reception unit 33a is explained in detail with reference to FIG. 6.

The reception unit 33a has a configuration identical to that of the reception unit 31a. However, the reception unit 33a does not need to have the MAC function of the IET. An allocation unit 314b receives a frame of the low-latency class or a frame of the general class from the terminal device 22. A class identification unit 312b refers to the class table 51 based on the storage information in a frame received by the allocation unit 314b and identifies if the received frame is a frame of the low-latency class or a frame of the general class. The class identification unit 312b may have the class table 51 for each reception port and identify the low-latency class or the general class on the basis of the storage information in a frame received by the allocation unit 314b. Further, similarly to the allocation unit 314a, the allocation unit 314b transfers a frame via the store-and-forward path no matter whether the class information of the frame is the low-latency class or the general class.

The functional block diagram of the reception unit 34a is identical to that of the reception unit 33a. However, the allocation unit 314b receives a frame of the low-latency class or a frame of the general class from the terminal device 23.

Figure 7:
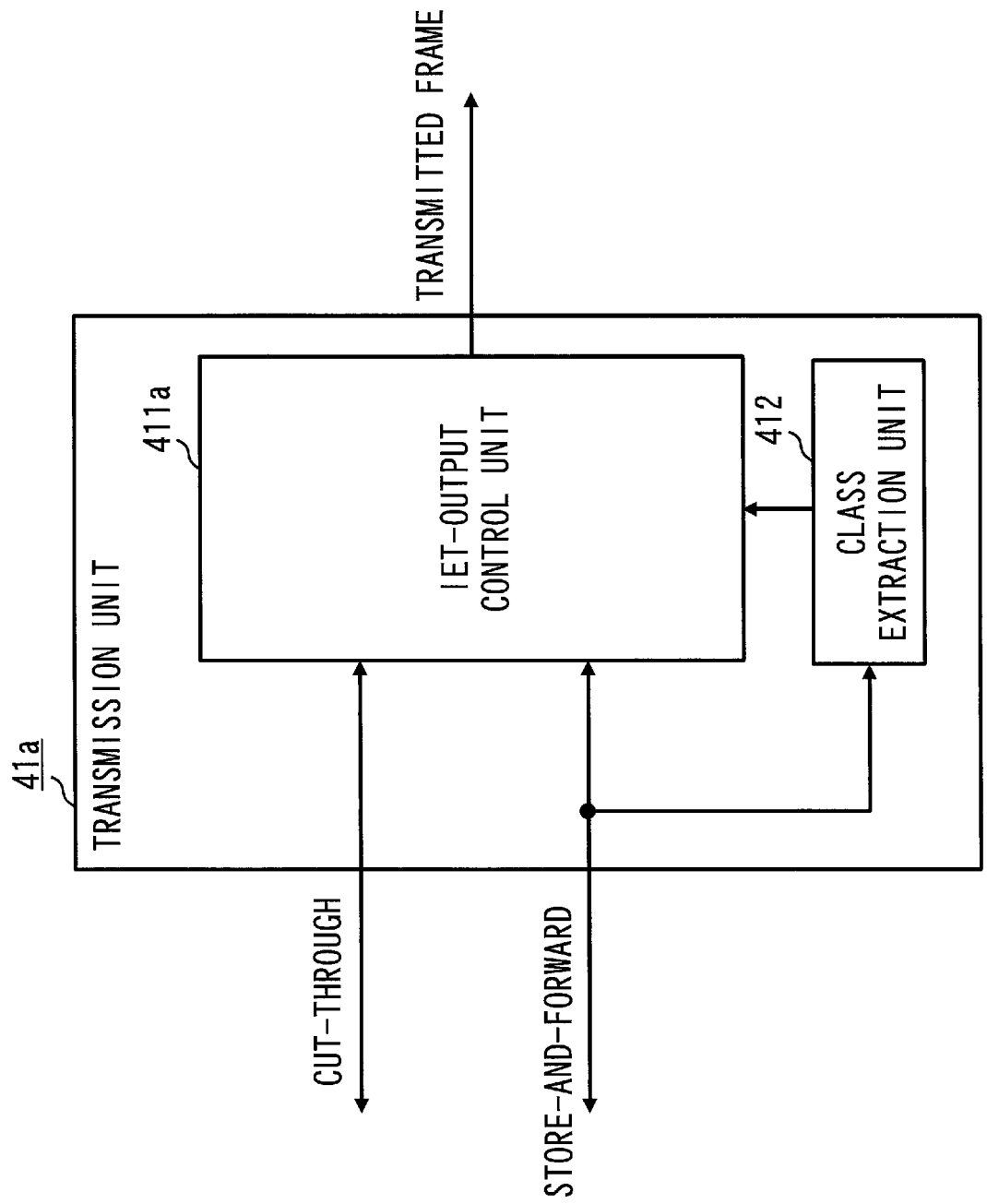
FIG. 7 is a functional block diagram of a transmission unit of the transfer device according to the first embodiment of the present invention.

FIG. 7 is a functional block diagram of the transmission unit 41a of the transfer device 11a according to the first embodiment of the present invention. The transmission unit 41a is explained in detail with reference to FIG. 7.

The transmission unit 41a includes an IET-output control unit 411a and a class extraction unit 412.

The class extraction unit 412 extracts the class information provided to a frame by the allocation unit 314b from the frame received through the store-and-forward path.

When there is a transmission request for a frame through the cut-through path during transmission of a frame through the store-and-forward path, the IET-output control unit 411a determines whether the frame being transferred by store-and-forward can be divided on the basis of the class information extracted by the class extraction unit 412. When the class information is the low-latency class, the IET-output control unit 411a outputs the frame being transferred to the end without dividing the frame and thereafter outputs the frame of the cut-through path. When the frame on the store-and-forward side is a frame of the general class, interrupt transfer of the frame from the cut-through path can be performed depending on the transfer state of the frame, in a similar manner to the normal IET output control. When outputting a frame of the low-latency class of the store-andforward path without dividing the frame, the IET-output control unit 411a provides the SMD-E value to the header of the frame.

The functional block diagram of the transmission unit 42a is identical to that of the transmission unit 41a.

Figure 8:
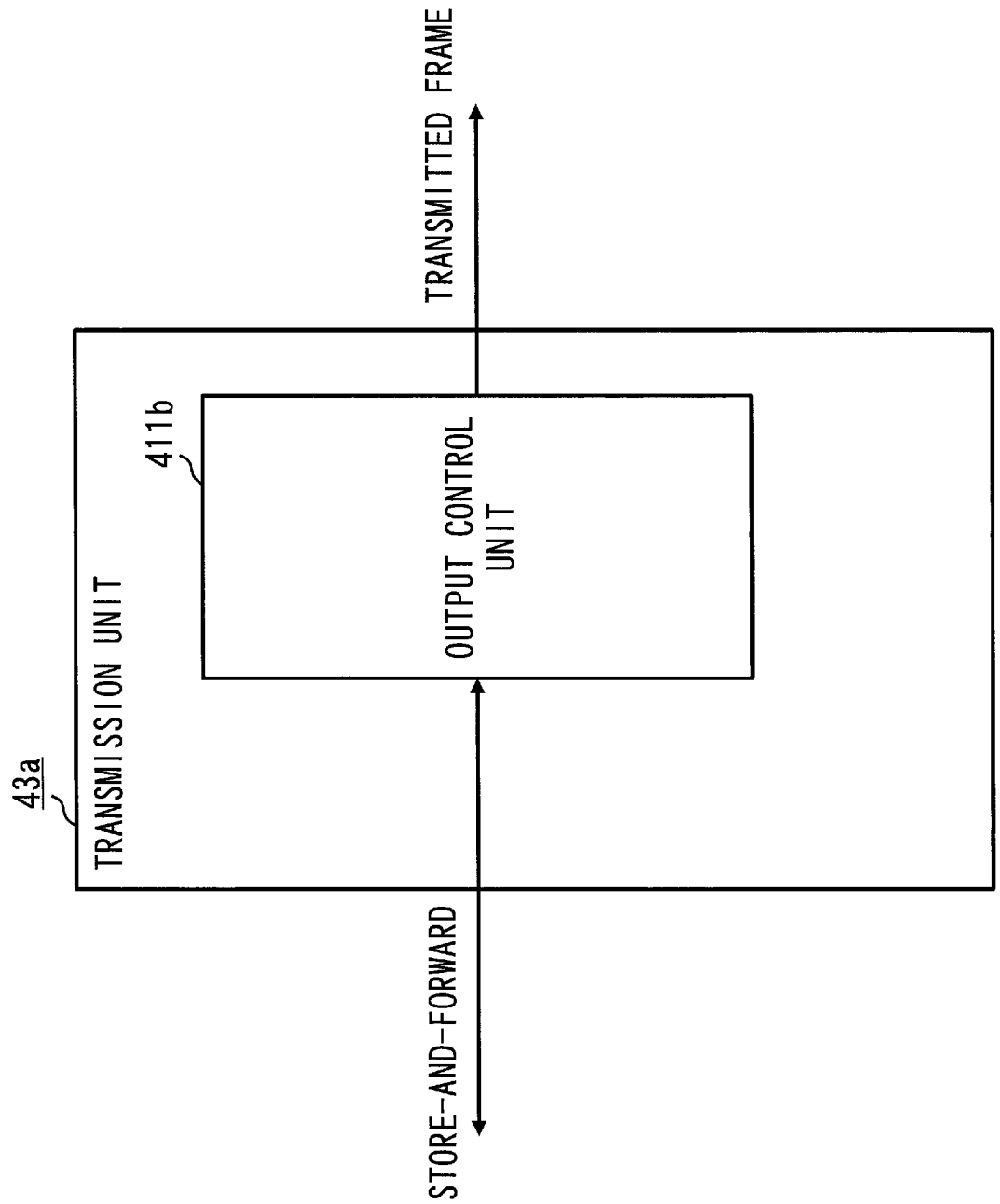
FIG. 8 is a functional block diagram of another transmission unit of the transfer device according to the first embodiment of the present invention.

FIG. 8 is a functional block diagram of the transmission unit 43a of the transfer device 11a according to the first, embodiment of the present invention. The transmission unit 43a is explained in detail with reference to FIG. 8.

The transmission unit 43a includes an output control unit 411b that sequentially transmits frames to be transferred by store-and-forward. The transmission unit 43a may include the class extraction unit 412 while it is not essential.

The output control unit 411b outputs by store-and-forward since the pathway decided by the reception unit that has received the frames is only a pathway to transfer by store-and-forward. Frames to be transferred by cut-through are not input to the output control unit 411b and therefore there is no need to perform interrupt transfer according to the IET.

The functional block diagram of the transmission unit 44a is identical to that of the transmission unit 43a.

A hardware configuration of the transfer device 11a according to the first embodiment is explained next.

Figure 9:
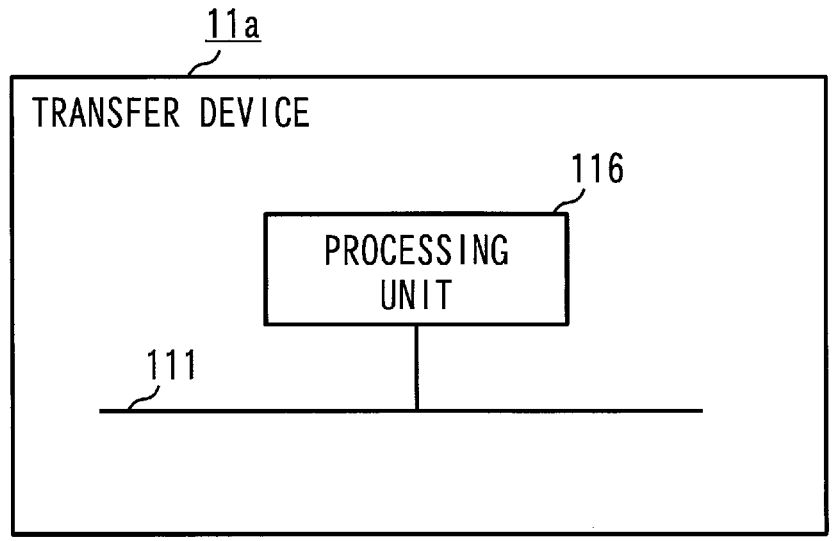
FIG. 9 is a hardware configuration diagram of the transfer device according to the first embodiment of the present invention.

FIG. 9 is a hardware configuration diagram of the transfer device 11a according to the first embodiment of the present invention. A configuration of the transfer device 11a according to the first embodiment of the present invention is explained with reference to FIG. 9.

The transfer device 11a includes a bus 111 and a processing circuit 116.

The bus 111 is a signal path that electrically connects devices to each other and transmits or receives frames.

The processing circuit 116 is for example, a single circuit, a composite circuit, a programmed processor, an ASIC (Application Specific Integrated Circuit), an FPGA (Field-Programmable Gate Array), or a combination of these. The processing circuit 116 realizes respective functions of the reception units 31a to 34a, the class table 51, the destination resolution table 52, the coupling processing units 61 and 62, the switching processing unit 71, the cut-through storage units 91a and 92a, the store-and-forward storage units 81a to 84a, and the transmission units 41a to 44a collectively. The processing circuit 116 may realize the respective functions of the reception units 31a to 34a, the class table 51, the destination resolution table 52, the coupling processing units 61 and 62, the switching processing unit 71, the cut-through storage units 91a and 92a, the store-and-forward storage units 81a to 84a, and the transmission units 41a to 44a with separate processing circuits.

Figure 10:
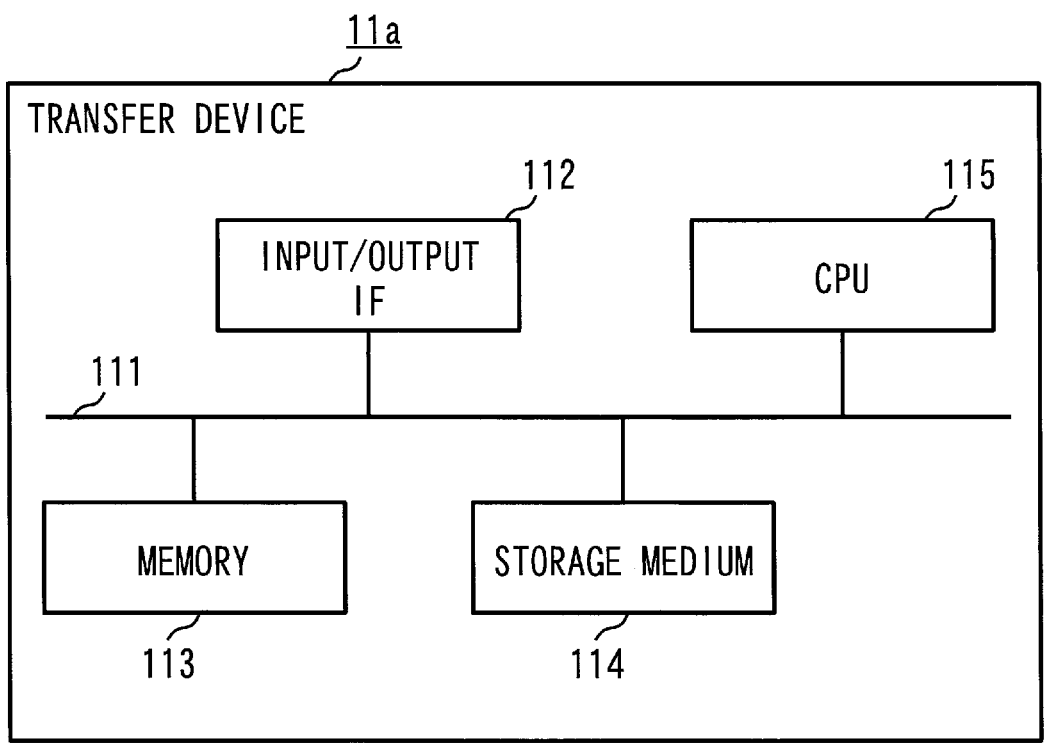
FIG. 10 is another hardware configuration diagram of the transfer device according to the first embodiment of the present invention.

FIG. 10 is another hardware configuration diagram of the transfer device 11a according to the first embodiment of the present invention. Another configuration of the transfer device 11a is explained with reference to FIG. 10.

The functions of the transfer device 11a are realized by software, firmware, or a combination of software and firmware. The software, the firmware, or the combination of software and firmware is described as a program.

The transfer device 11a includes hardware such as the bus 111, an input/output interface 112, a memory 113, a storage medium 114, and a CPU (Central Processing Unit) 115. In the following descriptions, the input/output interface 112 is described as the input/output IF 112.

The bus 111 is a signal path that electrically connects devices to each other and transmits or receives frames similarly in FIG. 9.

The input/output IF 112 transmits or receives frames. The reception units 31a to 34a and the transmission units 41a to 44a are realized by the input/output IF 112.

The memory 113 functions as a work area into which programs stored in the storage medium 114 are loaded. The memory 113 is, for example, a RAM (Random Access Memory).

The storage medium 114 stores therein programs to realize functions, such as a program for deciding a transfer pathway or a program for executing output control. The storage medium 114 stores therein frame data, the type information of the input ports, the output port information, the class information, and the like. The storage medium 114 is, for example, a non-volatile or volatile semiconductor memory such as a ROM (Read Only Memory), a flash memory, an EPROM (Erasable Programmable Read Only Memory), an EEPROM (Electrically Erasable Programmable Read Only Memory), or an HDD (Hard Disk Drive). The storage medium 114 also stores therein an OS (Operating System). The reception units 31a to 34a, the class table 51, the destination resolution table 52, the coupling processing units 61 and 62, the store-and-forward storage units 81a to 84a, and the cut-through storage units 91a and 92a are realized by the storage medium 114.

The CPU 115 is connected to other devices via the bus 111 and controls these devices. The CPU 115 reads programs in the storage medium 114, which have been loaded into the memory 113, and executes the programs. The CPU 115 loads at least a part of the OS stored in the storage medium 114 into the memory 113 and executes the program while executing the OS. The CPU 115 is an IC (Integrated Circuit) that performs processing. The CPU may be a central processing device, an arithmetic device, a microprocessor, a microcomputer, a processor, or a DSP (Digital Signal Processor). The reception units 31a to 34a, the coupling processing units 61 and 62, the switching processing unit 71, and the transmission units 41a to 44a are realized by reading programs of the storage medium 114, having been loaded into the memory 113, and executing the programs by the CPU 115.

Information of the devices, frames, signal values, and the like are stored in the memory 113, the storage medium 114, or a register or a cache memory in the CPU 115.

The memory 113 and the storage medium 114 may be a same device without being separately provided.

Further, the programs may be stored in a portable recording medium such as a magnetic disk, a flexible disk, an optical disk, a compact disk, and a DVD (Digital Versatile Disk).

Furthermore, it is also possible to realize a part of the functions of the reception units 31a to 34a, the class table 51, the destination resolution table 52, the coupling processing units 61 and 62, the switching processing unit 71, the store-and-forward storage units 81a to 84a, the cut-through storage units 91a and 92a, and the transmission units 41a to 44a of the transfer device 11a with dedicated hardware and realize another part with software or firmware. For example, it is possible to realize the functions of the reception units 31a to 34a, the class table 51, the destination resolution table 52, the coupling processing units 61 and 62, the switching processing unit 71, the cut-through storage units 91a and 92a, and the store-and-forward storage units 81a to 84a with a processing circuit being dedicated hardware and realize the functions of the transmission units 41a to 44a with the CPU 115 being a processing circuit that reads the program stored in the storage medium 114 and executes the program. The processing circuit can realize the functions of the transfer device 11*a* with hardware, software, firmware, or a combination thereof.

An operation of the transfer device 11*a* is explained next.

Figure 11:
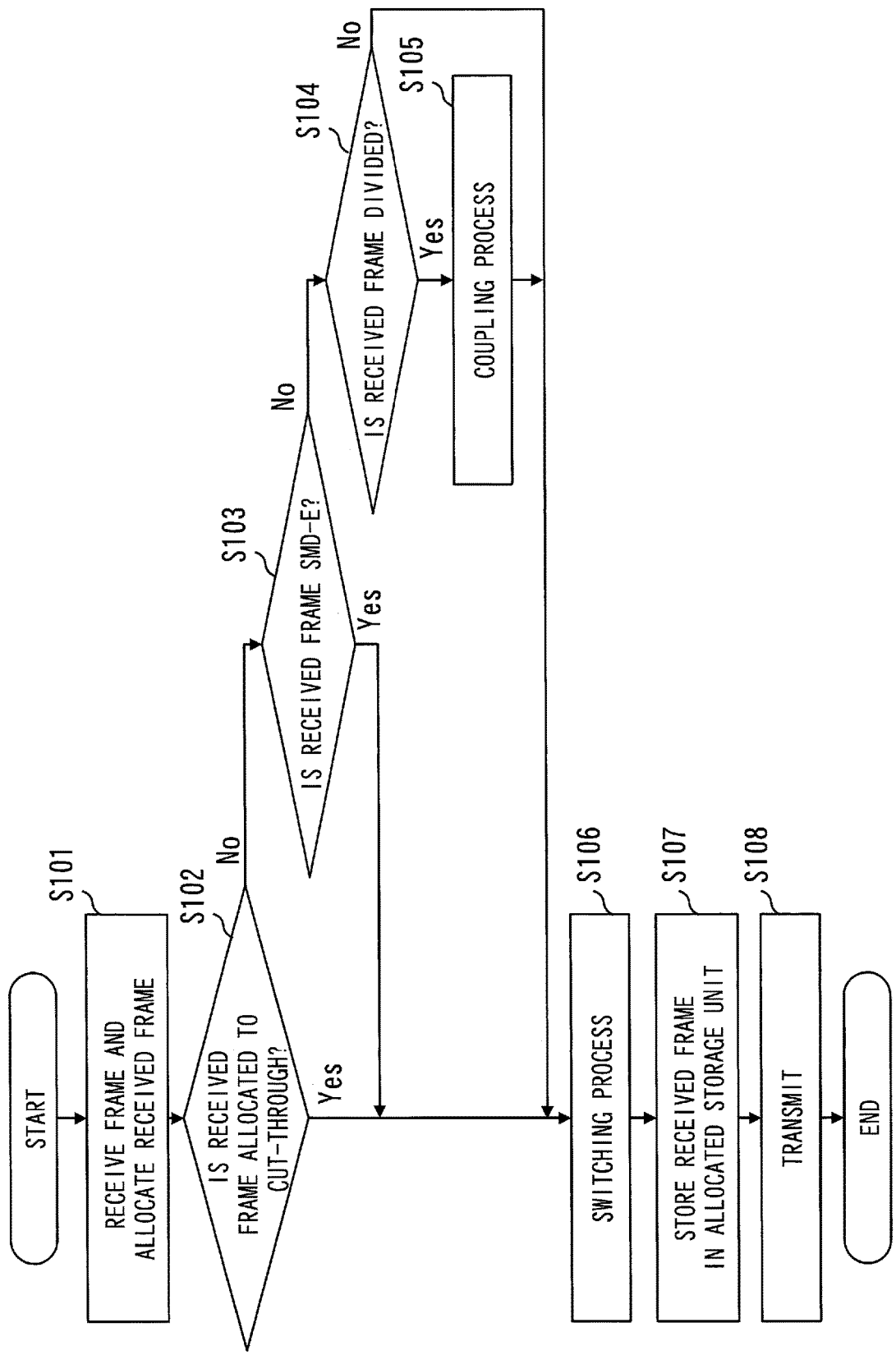
FIG. 11 is a flowchart illustrating an operation of the transfer device according to the first embodiment of the present invention.

FIG. 11 is a flowchart illustrating an operation of the transfer device 11*a* according to the first embodiment of the present invention. FIG. 11 illustrates an operation of the transfer device 11*a* in a case where there is one output port. An operation of the transfer device 11*a* is explained below with reference to FIG. 11.

In Step S101, the reception unit 31*a* receives a frame of the low-latency class or a frame of the general class from the terminal device 21, and decides a pathway through which the received frame is to be transferred. The reception unit 31*a* allocates the received frame to the cut-through path when the frame is to be transferred by cut-through, and allocates the received frame to the store-and-forward path when the frame is to be transferred by store-and-forward on the basis of the decided pathway. There is a case where the reception unit 31*a* transfers the received frame to a plurality of ports. In this case, the reception unit 31*a* may output the frame to both the cut-through path and the store-and-forward path. The reception units 32*a* to 34*a* are identical to the reception unit 31*a*. However, the reception units 33*a* and 34*a* output frames only to the store-and-forward path.

In Step S102, when the reception unit 31*a* allocates the received frame to the cut-through path, Step S102: Yes is obtained and the process proceeds to Step S106. When the reception unit 31*a* allocates the received frame to the store-and-forward path, Step S102: No is obtained and the process proceeds to Step S103. The reception unit 32*a* is identical to the reception unit 31*a*.

In Step S102, the reception units 33*a* and 34*a* allocate a frame to the store-and-forward path no matter whether the class information of the frame is the low-latency class or the general class. Therefore, Step S102: No is obtained and the process proceeds to Step S103.

In Step S103, the coupling processing unit 61 receives the frame through the store-and-forward path from the reception unit 31*a*. The coupling processing unit 61 determines whether the received frame is divided.

In Step S103, the coupling processing unit 61 transfers the received frame as it is through the store-and-forward path of the low-latency class when the SMD value of the received frame is "SMD-E" (Step S103: Yes). When Step 103: No is obtained and the SMD value of the received frame is "SMD-S" or "SMD-C", the coupling processing unit 61 temporarily stores the frame data in the storage unit for the general class in Step S104. When the received frame is divided (Step S104: Yes), the coupling processing unit 61 couples divided fragments in Step S105 and performs transfer in the unit of a frame through the store-and-forward path of the general class. When the received frame is not divided (Step S104: No), the coupling processing unit 61 performs transfer in the unit of a frame through the store-and-forward path of the general class without performing the coupling process. The coupling processing unit 62 is identical to the coupling processing unit 61.

In Step S106, the switching processing unit 71 receives a frame through the cut-through path from the reception unit 31*a*. The switching processing unit 71 receives a frame through the store-and-forward path from the coupling processing unit 61. The switching processing unit 71 receives a frame through the cut-through path from the reception unit 32*a*. The switching processing unit 71 receives a frame through the store-and-forward path from the coupling processing unit 62. The switching processing unit 71 receives a frame through the store-and-forward path from the reception unit 33*a*. The switching processing unit 71 receives a frame through the store-and-forward path from the reception unit 34*a*. The switching processing unit 71 multiplexes frames received through the store-and-forward path and allocates the frames to the store-and-forward storage unit of each output port.

For example, when a frame is received from the reception unit 31*a* and the frame is to be transferred to the port 102 by cut-through, the switching processing unit 71 transmits the frame to the cut-through storage unit 92*a*.

For example, when a frame is received from the reception unit 31*a* and the frame is to be transferred to the port 102 by store-and-forward, the switching processing unit 71 transmits the frame to the store-and-forward storage unit 82*a*.

In Step S107, the cut-through storage unit 91*a* stores therein a frame that is transmitted from the switching processing unit 71 and that is to be transferred by cut-through. The cut-through storage unit 91*a* transmits to the transmission unit 41*a*, a transmission request indicating that a frame is located in the cut-through storage unit 91*a* and can be transmitted, when a predetermined number of bytes from the head of the frame are stored therein. The predetermined number of bytes is, for example, 6 bytes, 64 bytes or the like. The transmission request is, for example, a level signal indicating whether there is a frame to be transmitted. The cut-through storage unit 92*a* has functions identical to those of the cut-through storage unit 91*a*.

In Step S107, the store-and-forward storage unit 81*a* stores therein frames that are transmitted from the switching processing unit 71 and are to be transferred by store-and-forward. The store-and-forward storage unit 81*a* manages and stores frames input with respect to each of a plurality of priority classes in the order of inputting. The store-and-forward storage unit 81*a* transmits to the transmission unit 41*a*, a transmission request indicating that transmission is possible, when one or more frames are located in the store-and-forward storage unit 81*a*. The transmission request is, for example, a level signal indicating whether there is a frame to be transmitted. When a transmission permission is issued from the transmission unit 41*a*, the store-and-forward storage unit 81*a* preferentially transmits frames of a higher priority class among the stored frames to the transmission unit 41*a*. When transmitting frames, the store-and-forward storage unit 81*a* notifies the transmission unit 41*a* also of the class information of the frames and frame information such as the frame length. The class information of a frame and the frame length may be stored in the header of the frame or in a portion being the leading fragment of data. The store-and-forward storage unit 81*a* starts or stops transmission on the basis of whether there is a transmission permission from the transmission unit 41*a*. The store-and-forward storage units 82*a* to 84*a* have functions identical to those of the store-and-forward storage unit 81*a*. However, the store-and-forward storage units 83*a* and 84*a* may only transmit frames of a higher priority class preferentially in the order of inputting according to transfer rates of the corresponding output ports, without transmitting a transmission request. In this case, notification of the frame information is unnecessary.

In Step S108 the transmission unit 41*a* receives the transmission request. The transmission unit 41*a* transmits a frame transmission permission to the cut-through storage unit 91*a* or the store-and-forward storage unit 81*a*. The transmission unit 41*a* receives a frame from the cut-through storage unit 91*a* or the store-and-forward storage unit 81*a* to which the transmission permission has been transmitted.

The transmission unit 41a transmits a frame of the low-latency class or a frame of the general class in either the cut-through storage unit 91a or the store-and-forward storage unit 81a to which the transmission permission has been transmitted, to the terminal device 21. While the transmission unit 42a is identical to that of the transmission unit 41a, a device connected to the transmission port 102 is the transfer device 12a.

In Step S108, the transmission unit 43a may receive or may not receive a transmission request. In a case of receiving a transmission request, the transmission unit 43a transmits a frame transmission permission to the store-and-forward storage unit 83a. The transmission unit 43a receives a frame from the store-and-forward storage unit 83a. The transmission unit 43a transmits a frame of the low-latency class or a frame of the general class to the terminal device 22. In a case of not receiving a transmission request, if the transmission unit 43a receives a frame from the store-and-forward storage unit 83a, the transmission unit 43a transmits the received frame. The transmission unit 44a is identical to the transmission unit 43a.

Figure 12:
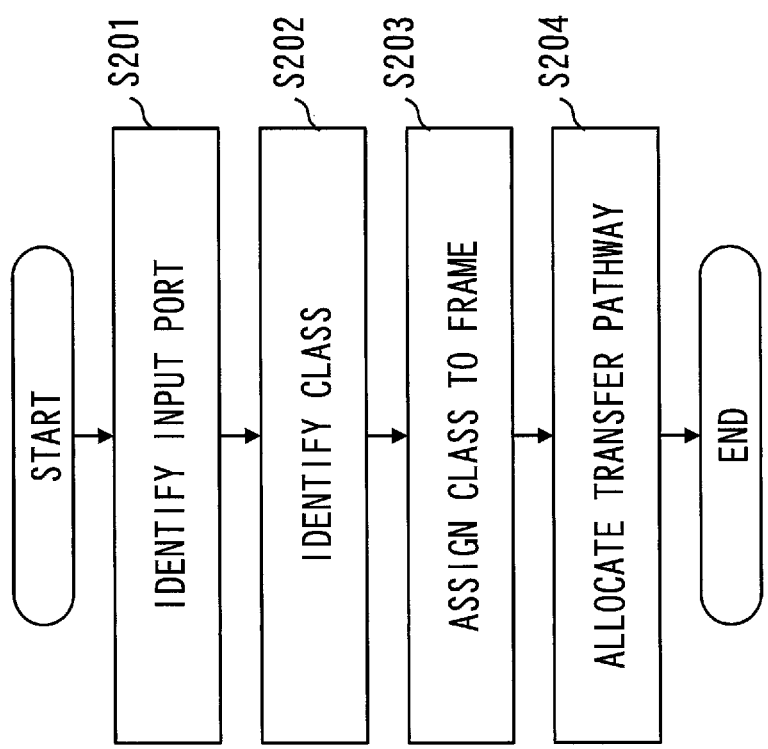
FIG. 12 is a flowchart illustrating an operation of the reception unit of the transfer device according to the first embodiment of the present invention.

FIG. 12 is a flowchart illustrating an operation of the reception unit 31a in the transfer device 11a according to the first embodiment of the present invention. The operation in Step S101 in FIG. 11 is explained in detail below with reference to FIG. 12.

The allocation unit 314a receives a frame of the low latency class or a frame of the general class from the terminal device 21, and the input-port identification unit 311 identifies type information of the input port to which the frame has been input in Step S201. In the first embodiment, the type information of an input port is an input port number. The input-port identification unit 311 stores therein that the input port number is the port 101 in advance. The input-port identification unit 311 outputs information of the port 101 as the type information of the input port to the allocation unit 341a. The input-port identification units 311 of the reception units 32a to 34a perform operations identical to those of the input-port identification unit 311 of the reception unit 31a.

In Step S202, the class identification units 312a and 312b identify whether the received frame is a frame of the low-latency class or a frame of the general class on the basis of the storage information in the received frame. The class identification unit 312a of the reception unit 31a in FIG. 5 indicates a case of not referring to the class table, and the class identification unit 312b of the reception unit 33a in FIG. 6 indicates a case of referring to the class table.

FIG. 13 is a diagram illustrating a class identification method based on an SMD value performed by the class identification unit 312a.

In FIG. 13, the SMD value is used as storage information in a received frame.

The class identification unit 312a identifies a received frame as a frame of the low-latency class, when the SMD value being the storage information in the frame is SMD-E as illustrated in FIG. 13. The class identification unit 312a identifies a received frame as a frame of the general class, when the SMD value being the storage information in the frame is SMD-S or SMD-C.

FIG. 14 is a diagram illustrating an example of the class table 51.

The class table 51 illustrated in FIG. 14 is a table that uses destination IP addresses as the storage information in received frames and associates the destination IP addresses of received frames and class information of the frames with each other.

The class identification unit 312b refers to the class table 51 illustrated in FIG. 14 and identifies a received frame as the low-latency class when the destination IP address being the storage information in the frame is AA.AA.AA.AA, and identifies a received frame as a frame of the general class when the destination IP address is CC.CC.CC.CC. The storage information in a frame to be associated with the class in the class table 51 is not limited to the destination IP address. Plural types of storage information in a frame can be combined to be associated with a class. Each of the classes associated with the storage information can include a plurality of classes as long as the classes are sorted into the low-latency class and the general class.

One class table 51 can be installed on the device or can be installed on each of the reception units.

Returning to Step S202 in FIG. 12, the class identification unit 312a outputs the class information of the frame to the allocation unit 314a. The class information is either the low-latency class or the general class. The class identification unit 312a of the reception unit 32a performs operations identical to those of the class identification unit 312a of the reception unit 31a. The class identification unit 312b outputs the class information of the frame to the allocation unit 314b. The class information is either the low-latency class or the general class. The class identification unit 312b of the reception unit 34-a performs operations identical to those of the class identification unit 312b of the reception unit 33a.

In Step S203, the output-port decision unit 313 decides an output port of the frame received from the terminal device 21. The output-port decision unit 313 decides an output port to which the received frame is to be transferred, referring to the destination resolution table 52 based on the storage information in the received frame.

While an example of the destination resolution table 52 is a general layer-2 switch FDB table that decides an output port on the basis of the destination MAC address, VLAN (Virtual Local Area Network) tag information, or the like in the frame, the destination resolution table 52 is not particularly limited thereto as long as it is a table for deciding an output port. The output-port decision unit 313 outputs the output port information decided by the destination resolution table 52 to the allocation unit 314a. The output port may be a plurality of ports.

The output-port decision units 313 in the reception units 32a to 34a perform operations identical to those of the output-port decision unit 313 in the reception unit 31a.

In Step S204, the allocation unit 314a receives the type information of the input port, the class information of the frame from the class identification unit 312a, and the output port information from the output-port decision unit 313.

The allocation unit 314a decides whether to transfer the frame through the store-and-forward path or the cut-through path on the basis of the type information of the input port, the class information of the frame, and the output port information, and allocates the frame to the decided pathway. The cut-through path transfers only frames of the low-latency class and has one input port associated with one output port.

FIG. 15 is an example illustrating output ports for input ports that transfer frames by cut-through according to the first embodiment.

The allocation unit 314a has stored therein association of output ports with input ports that transfer frames by cut-through as a bitmap as illustrated in FIG. 15. The output port bitmap of FIG. 15 corresponds to the port 101, the port 102, the port 103 and the port 104 from the right and indicates that cut-through is done for a port having a value "1". The transfer device 11a sets in advance input ports that transfer by cut-through to each of the output ports. Therefore, only one of the input ports has a value "1" with respect to each of the output ports in the output port bitmap. The transfer device 11a does not need to have cut-through storage units as many as the input ports and therefore transfer control is easier. Further, an increase in the circuit scale can be prevented. In the first embodiment, transferring by cut-through is possible in transferring from the port 101 to the port 102 and in transferring from the port 102 to the port 101. While transferring by cut-through is possible in both directions between the port 101 and the port 102 in the first embodiment, it is acceptable that, for example, transferring by cut-through is possible only in transferring from the port 101 to the port 102 and transferring by cut-through is not possible in transferring from the port 102 to the port 101. Any ports can be used for transferring by cut-through. However, transferring by cut-through from a plurality of input ports to one output port is not acceptable. Transferring by cut-through from only one input port to a plurality of output ports is acceptable.

The allocation unit 314a checks the type information of the input port and the output port against FIG. 15 with respect to a frame of the low-latency class being a target frame. When the check is satisfied, the allocation unit 314a transfers the target frame to the cut-through path. When the class information of a frame is the general class or the check is not satisfied even if the class information is the low-latency class, the allocation unit 314a transfers the target frame through the store-and-forward path.

When transferring a frame, the allocation unit 314a provides the class information and the output port information of the target frame. The information can be stored in the header or data of the frame and the way of providing the information is not particularly limited as long as the information can be managed in units of frames on a one-to-one basis.

Return to Step S204 in FIG. 12. The allocation unit 314a of the reception unit 32a performs operations identical to those of the allocation unit 314a of the reception unit 31a.

The allocation unit 314b of the reception unit 33a or the reception unit 34a performs operations identical to those of the allocation unit 314a of the reception unit 31a. However, since the cut-through is not set to a pathway including the input port 103 or the input port 104 in FIG. 15, frames are allocated to the store-and-forward path no matter whether the class information of the frames is the low-latency class or the general class.

Figure 16:
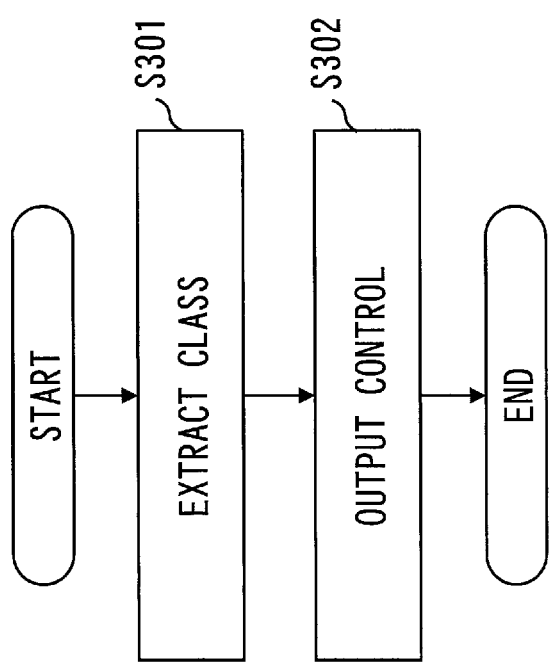
FIG. 16 is a flowchart illustrating an operation of the transmission unit of the transfer device according to the first embodiment of the present invention.

FIG. 16 is a flowchart illustrating an operation of the transmission unit 41a of the transfer device 11a according to the first embodiment of the present invention. The operation in Step S108 in FIG. 11 is explained in detail below with reference to FIG. 16.

In Step S301, the class extraction unit 412 receives a frame stored in the cut-through storage unit 91a. The class extraction unit 412 extracts the class information stored in the frame by the allocation unit 314a from the frame. The class extraction unit 412 outputs the extracted class information of the frame to the IET-output control unit 411a. The class extraction unit 412 of the transmission unit 42a performs operations identical to those of the class extraction unit 412 of the transmission unit 41a.

In Step S302, the IET-output control unit 411a outputs a frame received from the cut-through storage unit 91a. The IET-output control unit 411a also outputs a frame received from the store-and-forward storage unit 81a. The IET-output control unit 411a decides whether to divide the frame stored in the store-and-forward storage unit 81a on the basis of the class information of the frame to be transferred by store-and-forward. When the frame is to be divided, the IET-output control unit 411a divides and outputs the frame. The IET-output control unit 411a of the transmission unit 42a is identical to that of the transmission unit 41a. Details of the IET-output control units 411a of the transmission units 41a and 42a and the output control units 411b of the transmission units 43a and 44a are explained later.

Figure 17:
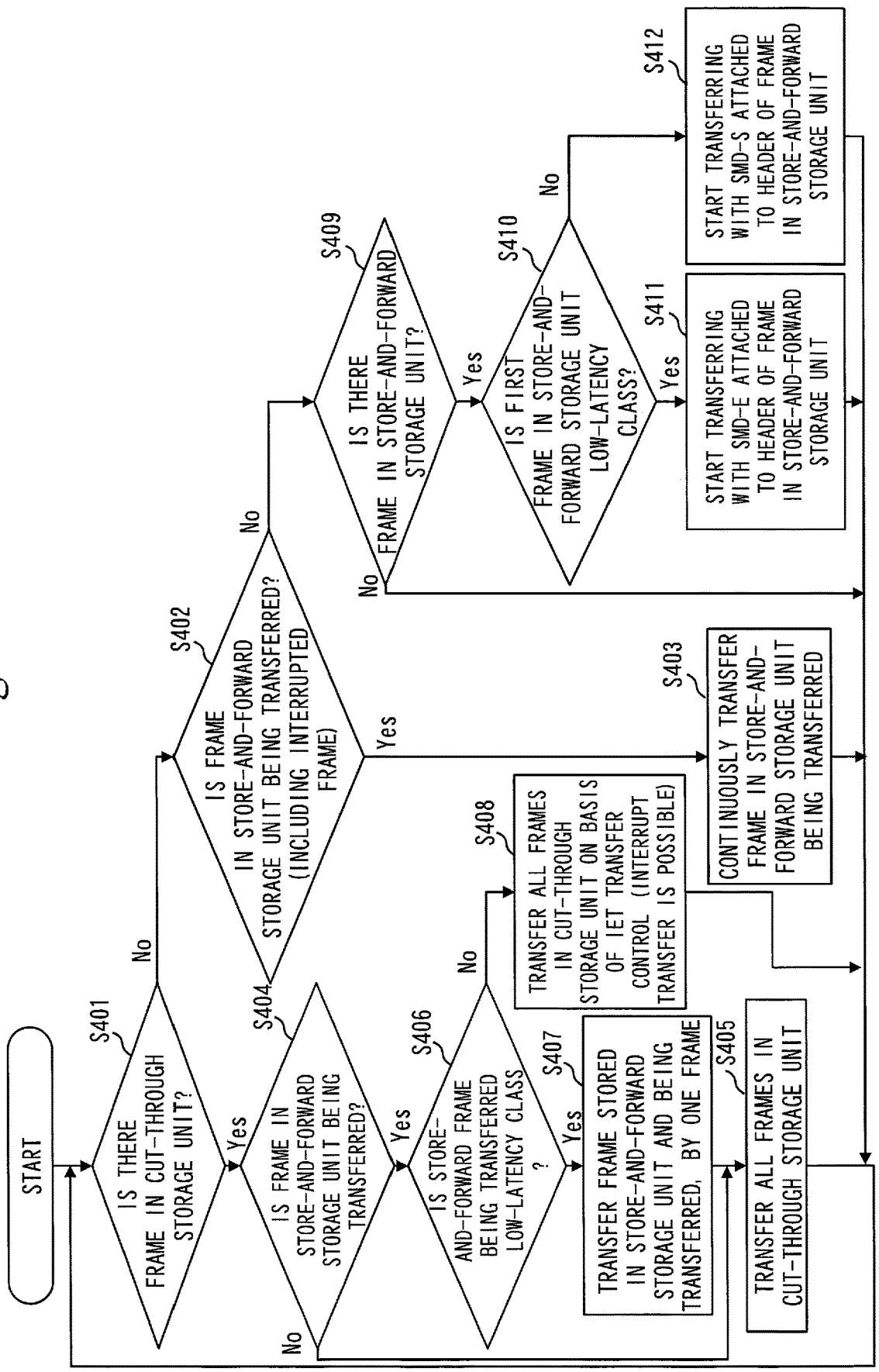
FIG. 17 is a flowchart illustrating an operation of an IET-output control unit of the transmission unit of the transfer device according to the first embodiment of the present invention.

FIG. 17 is a flowchart illustrating an operation of the IET-output control unit 411a of the transmission unit 41a in the transfer device 11a according to the first embodiment of the present invention. The operation in Step S302 in FIG. 16 is explained in detail below with reference to FIG. 17.

The IET-output control unit 411a starts processing when a transmission request is received from the cut-through storage unit 91a or the store-and-forward storage unit 81a.

In Step S401, the IET-output control unit 411a receives a transmission request from the cut-through storage unit 91a. If the IET-output control unit 411a has received the transmission request from the cut-through storage unit 91a, the IET-output control unit 411a determines that a frame of the low-latency class is stored in the cut-through storage unit 91a. Therefore, Step S401: Yes is obtained and the process proceeds to Step S404. If the IET-output control unit 411a has received no transmission request from the cut-through storage unit 91a, the IET-output control unit 411a determines that no frame of the low-latency class is stored in the cut-through storage unit 91a. Accordingly, Step S401: No is obtained and the process proceeds to Step S402. Step S401 of the IET-output control unit 411a in the transmission unit 42a is identical to that in the transmission unit 41a.

In Step S402, when the IET-output control unit 411a transmits a frame transmission permission to the store-and-forward storage unit 81a or when it is determined that the IET-output control unit 411a stops frame transfer by the IET and a frame stored in the store-and-forward storage unit 81a is being transferred, Step S402: Yes is obtained and the process proceeds to Step S403. When the IET-output control unit 411a transmits no transmission permission to the store-and-forward storage unit 81a and when the IET-output control unit 411a does not stop transfer of a frame from the store-and-forward storage unit 81a, Step S402: No is obtained and the process proceeds to Step S409. Step S402 of the IET-output control unit 411a in the transmission unit 42a is identical to that in the transmission unit 41a.

In Step S409, if the IET-output control unit 411a has received a transmission request from the store-and-forward storage unit 81a, the IET-output control unit 411a determines that a frame is stored in the store-and-forward storage unit 81a, Step S409: Yes is obtained and the process proceeds to Step S410. If the IET-output control unit 411a has received no transmission request from the store-and-forward storage unit 81a, Step S409: No is obtained and the process returns to Step S401. Step S409 of the IET-output control unit 411a in the transmission unit 42a is identical to that in the transmission unit 41a.

In Step S410, when the IET-output control unit 411a determines that a frame stored in the store-and-forward storage unit 81a and to be transferred first is a frame of the low-latency class, Step S410: Yes is obtained and the process proceeds to Step S411. In Step S411, the IET-output control unit 411a transmits a transmission permission to the store-and-forward storage unit 81a and receives a frame from the store-and-forward storage unit 81a. The IET-output control unit 411a provides SMD-E as the SMD value in the header of the frame that is stored in the store-and-forward storage unit 81*a* and that is to be transferred first, and transfers a predetermined number of bytes of the received frame to the terminal device 21. The predetermined number of bytes is, for example, 1 byte, 2 bytes or the like and is a period with which whether a frame has arrived at the cut-through storage unit 91*a* is checked. After Step S411, the process returns to Step S401.

When the IET-output control unit 411*a* determines in Step S410 that a frame that is stored in the store-and-forward storage unit 81*a* and that is to be transferred first is not a frame of the low-latency class, Step S410: No is obtained and the process proceeds to Step S412. In Step S412, the IET-output control unit 411*a* transmits a transmission permission to the store-and-forward storage unit 81*a* and receives a frame from the store-and-forward storage unit 81*a*. The IET-output control unit 411*a* provides SMD-S as the SMD value in the header of the received frame and transfers the predetermined number of bytes of the received frame to the terminal device 21. The predetermined number of bytes is, for example, 1 byte, 2 bytes or the like and is a period with which whether a frame has arrived at the cut-through storage unit 91*a* is checked. Transfer of the frame is started. After Step S412, the process returns to Step S401.

Step S410 of the IET-output control unit 411*a* in the transmission unit 42*a* is identical to that in the transmission unit 41*a*.

In Step S403, when the IET-output control unit 411*a* transmits a frame transmission permission to the store-and-forward storage unit 81*a*, the store-and-forward storage unit 81*a* continuously transfers to the transmission unit 41*a*, a frame that is being transferred. Alternatively, the store-and-forward storage unit 81*a* resumes transfer to the transmission unit 41*a* of a frame transfer of which has been stopped. The IET-output control unit 411*a* receives the frame from the store-and-forward storage unit 81*a* and transfers the predetermined number of bytes of the received frame to the terminal device 21. The predetermined number of bytes is, for example, 1 byte, 2 bytes or the like and is a period with which whether a frame has arrived at the cut-through storage unit 91*a* is checked. When a frame in the store-and-forward storage unit 81*a* is being transferred, the IET-output control unit 411*a* transfers to the terminal device 21, the predetermined number of bytes of the frame being transferred. After Step S403, the process returns to Step S401. Since the IET-output control unit 411*a* periodically checks whether a frame has arrived at the cut-through storage unit 91*a*, the IET-output control unit 411*a* can divide frames stored in the store-and-forward storage unit 81*a* in the middle of transferring and preferentially transfer frames of the low-latency class to the cut-through storage unit 91*a* even if it takes time to transfer all the frames stored in the store-and-forward storage unit 81*a*. Step S403 of the IET-output control unit 411*a* in the transmission unit 42*a* is identical to that of the transmission unit 41*a*.

Meanwhile, in Step S404, if the IET-output control unit 411*a* has transmitted a frame transmission permission to the store-and-forward storage unit 81*a*, the IET-output control unit 411*a* determines that a frame stored in the store-and-forward storage unit 81*a* is being transferred and Step S404: Yes is obtained, so that the process proceeds to Step S406. If the IET-output control unit 411*a* has transmitted no frame transmission permission to the store-and-forward storage unit 81*a*, Step S404: No is obtained and the process proceeds to Step S405. Step S404 of the IET-output control unit 411*a* in the transmission unit 42*a* is identical to that of the transmission unit 41*a*.

When the frame class information input from the class extraction unit 412 is the low-latency class in Step S406, the TFT-output control unit 411*a* determines that the frame stored in the store-and-forward storage unit 81*a* and being transferred is a frame of the low-latency class and Step S406: Yes is obtained, so that the process proceeds to Step S407. When the frame class information is the general class, the IET-output control unit 411*a* determines that the frame stored in the store-and-forward storage unit 81*a* and being transferred is not a frame of the low-latency class and Step S406: No is obtained, so that the process proceeds to Step S408. Step S406 of the IET-output control unit 411*a* in the transmission unit 42*a* is identical to that in the transmission unit 41*a*.

In Step S407, the IET-output control unit 411*a* transfers the frame that is stored in the store-and-forward storage unit 81*a* and that is being transferred, up to the end of one frame, to the terminal device 21. After Step S407, the process proceeds to Step S405. Step S407 of the IET-output control unit 411*a* in the transmission unit 42*a* is identical to that in the transmission unit 41*a*.

In Step S408, the frame stored in the store-and-forward storage unit 81*a* and being transferred is a frame of the general class. The IET-output control unit 411*a* performs interrupt transfer of frames stored in the cut-through storage unit 91*a*. In a frame having been divided by the IET, for example, the frame length of the trailing frame after division needs to be equal to or longer than a predetermined number of bytes, which is a minimum frame length of the Ethernet (registered trademark), and divided frames other than the trailing frame need to meet a minimum frame length specified to be equal to or larger than the predetermined number of bytes. The predetermined number of bytes is, for example, 6 bytes, 64 bytes or the like. The IET-output control unit 411*a* stops transfer of a frame of the general class if the divisible condition described above is satisfied. After Step S408, the process returns to Step S401. Step S408 of the IET-output control unit 411*a* in the transmission unit 42*a* is identical to that in the transmission unit 41*a*.

Meanwhile, in Step S405, the IET-output control unit 411*a* transmits a frame transmission permission to the cut-through storage unit 91*a*. When the frame transmission is issued permission from the transmission unit 41*a*, the cut-through storage unit 91*a* transfers a frame to the transmission unit 41*a*. The cut-through storage unit 91*a* stores therein the predetermined number of bytes from the head of the frame and then transfers the frame. The IET-output control unit 411*a* receives the frame from the cut-through storage unit 91*a*. The IET-output control unit 411*a* transfers all frames stored in the cut-through storage unit 91*a* to the terminal device 21. After Step S405, the process returns to Step S401. Step S405 of the IET-output control unit 411*a* in the transmission unit 42*a* is identical to that in the transmission unit 41*a*.

Since the output control unit 411*b* of the transmission unit 43*a* always transfers by store-and-forward, the output control unit 411*b* transmits a frame transmission permission to the store-and-forward storage unit 83*a* and receives a frame. The output control unit 411*b* transfers the received frame to the terminal device 22.

The output control unit 411*b* of the transmission unit 44*a* performs operations identical to those of the output control unit 411*b* of the transmission unit 43*a*.

The processing described above is repeated until there is a trigger for an end of the processing, such as turning OFF of a power source or execution of an end operation. With this processing, circuit scale of the low-latency transfer function of the IET becomes a smaller and the cost can be reduced as compared to the conventional transfer devices. While it is assumed that the processing described above is repeated, only one time of the processing without repetition may suffice.

As described above, the transfer device 11a according to the first embodiment includes the output-port decision unit 313 that decides, on the basis of storage information stored in a frame input, an output port to which the frame is output from among a plurality of ports, the allocation unit 314a that associates an input port to which the frame is input with an output port from which a frame transferred by the cut-through method is output on a one-to-one basis, and allocates a first frame to a first pathway transferring by the cut-through method and allocates a second frame to a second pathway transferring by the store-and-forward method on the basis of the type information of an input port to which a frame has been input, the class information of the frame, and the output port decided by the output-port decision unit, and the IET-output control unit 411a that outputs the first frame allocated to the first pathway from the output port, decides whether to divide the second frame on the basis of the class information of the second frame allocated to the second pathway, and outputs the second frame from the output port on the basis of decision. Therefore, the low-latency transfer function of the IET can be realized by simple control. The transfer device 11a does not need cut-through storage units as many as input ports with respect to each output port and therefore the low-latency transfer function of the IET can be realized with circuit scale smaller than that in the conventional transfer devices, which reduces the cost. In a transfer device having three or more input/output ports, the low-latency transfer function of the IET can be realized by control simpler than that in the conventional transfer devices while frames requiring low latency are transferred with low latency.

In the transfer device 11a according to the first embodiment, the IET-output control unit 411a outputs the second frame without dividing the second frame, when the class information of the second class is the low-latency class. Therefore, even when a frame is transferred by store-and-forward, the frame can be transferred without being divided by IET output control, if the frame is of the low-latency class.

Further, in the transfer device 11a according to the first embodiment, a pathway that is not set as a pathway that transfers by cut-through does not require a cut-through storage unit for a transmission unit and therefore the storage capacity can be reduced. Accordingly, decrease of the circuit scale and reduction of the cost can be achieved.

While the terminal devices 21 to 23 and the transfer device 12a of FIG. 1 are connected to the transfer device 11a according to the first embodiment described above, any number of terminal devices or transfer devices can be connected to the transfer device 11a as long as the total number of connected devices is three or more. In this case, the numbers of the reception units, the transmission units, the coupling processing units, the cut-through storage units, the store-and-forward storage units, and the like also change according to the number of connected devices. Also the transfer device 11a configured in this manner can achieve the effects of the first embodiment described above.

In the transfer system according to the first embodiment described above, the transfer device 11a and the transfer device 12a are connected and there is a pathway where frames pass through two transfer devices. However, there may be a pathway where frames pass through a plurality of transfer devices. For example, when frames of the low-latency class are transmitted from the terminal device 22 to the terminal device 26 via the transfer device 12a, frames are transferred by store-and-forward since a pathway to transfer frames from the terminal device 22 to the transfer device 12a by cut-through is not set. However, if a pathway to transfer frames from the transfer device 12a to the terminal device 26 by cut-through is set, transfer latency of frames in the second transfer devices and subsequent transfer devices can be reduced. Particularly, frames passing through many transfer devices and requiring low latency can be transferred with low latency.

Further, there can be a pathway where frames pass through only one transfer device. Also the transfer device 11a configured in this manner can achieve the effects of the first embodiment described above.

In the transfer device 11a according to the first embodiment described above, a pathway to transfer frames by cut-through is set between the port 101 connecting to the terminal device 21 and the port 102 connecting to the transfer device 12a. However, for example, a pathway to transfer frames by cut-through can be set between the port 103 connecting to the terminal device 22 and the port 104 connecting to the terminal device 23. A pathway to transfer frames by cut-through can be set between any ports. Also the transfer device 11a configured in this manner can achieve the effects of the first embodiment described above.

In the transfer device 11a according to the first embodiment described above, the allocation unit 314a is a combination of an output-port decision unit and an allocation unit. However, the output-port decision unit and the allocation unit can be separate independent components. Also the transfer device 11a configured in this manner can achieve the effects of the first embodiment described above.

In the transfer device 11a according to the first embodiment described above, the IET-output control unit 411a and the class extraction unit 412 are separate independent components. However, the IET-output control unit 411a and the class extraction unit 412 can be combined. Also the transfer device 11a configured in this manner can achieve the effects of the first embodiment described above.

In the transfer device 11a according to the first embodiment described above, frames are classified into the low-latency class and the general class. However, frames of the low-latency class can be further classified according to the priorities. The transfer device 11a can also classify frames of the general class according to the priorities. Further, the transfer device 11a can classify frames according to priorities of output ports for the frames. The transfer device 11a can have any number of sub-classes for classes of frames. Specifically, for example, in a case where frames of the low-latency class are classified according to the priorities, the transfer device 11a can have cut-through storage units as many as the priority classes and can transfer frames in the descending order of the priorities of the low-latency classes when frames are transferred by cut-through. At this time, the transfer device 11a separately stores class information indicating the sub-classes in the "data" of frames. Also the transfer device 11a configured in this manner can achieve the effects of the first embodiment described above and further sub-classes can be added.

In the transfer device 11a according to the first embodiment described above, the terminal devices 21 and 22 and the transfer devices 11a and 12a each include the MAC to which the IET technique is applied, to transfer frames of the low-latency class with low latency. Further, the transfer device 11a uses the input port number as the type information of input port. However, the transfer device 11*a* may use IET-correspondence existence information of each port as the type information of input port, the IET-correspondence existence information being stored in each port in advance. That is, the IET-correspondence existence information is information indicating whether a device connected to a port corresponds to the IET. It is assumed in this case that only some of terminal devices and transfer devices include the MAC to which the IET technique is applied. The transfer device 11*a* recognizes that the cut-through is set to only ports corresponding to the IET among ports. Also the transfer device 11*a* configured in this manner can achieve the effects of the first embodiment described above.

In the transfer device 11*a* according to the first embodiment described above, the terminal devices 21 and 22 and the transfer devices 11*a* and 12*a* each include the MAC to which the IET technique is applied, to transfer frames of the low-latency class with low latency. The transfer device 11*a* uses the input port number as the type information of input port. However, the transfer device 11*a* may use connected device information as the type information of input port. The connected device information is information indicating what is a device connected thereto, such as whether a device connected to an input port is a terminal device corresponding to the IET, a terminal device not-corresponding to the IET, a transfer device corresponding to the IET, or a transfer device not-corresponding to the IET. The connected device information may be set in the transfer device 11*a* in advance or may be described in frames to be received. It is assumed in this case that only some terminal devices and transfer devices include the MAC to which the IET technique is applied. The transfer device 11*a* recognizes that the cut-through is set only between devices corresponding to the IET. Also the transfer device 11*a* configured in this manner can achieve the effects of the first embodiment described above.

In the transfer device 11*a* according to the first embodiment described above, the terminal devices 21 and 22 and the transfer devices 11*a* and 12*a* each include the MAC to which the IET technique is applied, to transfer frames of the low-latency class with low latency. The transfer device 11*a* uses the input port number as the type information of input port. However, the transfer device 11*a* may use a combination of the IET-correspondence existence information of each port and the input port number as the type information of each input port, the IET-correspondence existence information being stored in each port in advance. Port numbers that correspond to the IET are known due to combining. It is assumed in this case that only some of terminal devices and transfer devices include the MAC to which the IET technique is applied. The transfer device 11*a* recognizes that the cut-through is set to only ports having port numbers corresponding to the IET. Any combination of the type information of input port can be used. Also the transfer device 11*a* configured in this manner can achieve the effects of the first embodiment described above.

In the transfer device 11*a* according to the first embodiment described above, the terminal devices 21 and 22 and the transfer devices 11*a* and 12*a* each include the MAC to which the IET technique is applied, to transfer frames of the low-latency class with low latency. The class identification unit 312*a* identifies the class of each frame on the basis of the destination IP address or the SMD value of the frame, being the storage information of the frame, and the class table 51. However, the transfer device 11*a* may also identify the class of the frame from the IET-correspondence existence information of each port, which is stored in each port in advance. It is assumed in this case that only some of terminal devices and transfer devices include the MAC to which the IET technique is applied. The transfer device 11*a* may also identify frames to be transferred between ports corresponding to the IET among ports, as frames of the low latency class, and identify frames to be transferred between ports including ports not corresponding to the IET, as frames of the general class. Also the transfer device 11*a* configured in this manner can achieve the effects of the first embodiment described above.

In the transfer device 11*a* according to the first embodiment described above, the class identification unit 312*a* identifies the class of each frame on the basis of the destination IP address or the SMD value of the frame, being the storage information of the frame, and the class table 51. However, the transfer device 11*a* can use the destination MAC address, the transmission source MAC address, the priority of the VLAN, the priority of an Ethernet (registered trademark) frame, the type of the Ethernet (registered trademark), a part of header information of an IP packet, a logical port number, and the like, or information of a combination of a plurality thereof as the storage information of each frame. The information is not particularly limited as long as it is the storage information of each frame. Also the transfer device 11*a* configured in this manner can achieve the effects of the first embodiment described above.

In the transfer device 11*a* according to the first embodiment described above, the terminal devices 21 and 22 and the transfer devices 11*a* and 12*a* each include the MAC to which the IET technique is applied, to transfer frames of the low-latency class with low latency. Further, the class identification unit 312*a* identifies the class of each frame on the basis of the destination IP address or the SMD value of the frame, being the storage information of the frame, and the class table 51. However, the transfer device 11*a* can also identify the class of each frame on the basis of a combination of IET-correspondence existence information of each port, which is stored in advance, the SMD value, and the class table 51. It is assumed in this case that only some of terminal devices and transfer devices include the MAC to which the IET technique is applied. In a case where the SMD value is set to a frame although a device connected to a port is a device not corresponding to the IET technique, the transfer device 11*a* determines the frame as an error and discards the frame. Therefore, the class can be also identified on the basis of the SMD value and the class table 51 after checking whether the device corresponds to the IET technique. Any combination of information for identifying the class of each frame can be used. Also the transfer device 11*a* configured in this manner can achieve the effects of the first embodiment described above.

In the transfer device 11*a* according to the first embodiment described above, the allocation unit stores the information of the class of each frame in the item of "data" of the frame and transmits the frame, thereby transmitting the class information of the frame to the class extraction unit 412. However, frames can be managed using an identification number that can uniquely bind a frame and the class information with each other. Specifically, the transfer device 11*a* assigns an identification number to each frame. The transfer device 11*a* includes a table associating the identification numbers of frames and class information of each of the frames. When the class extraction unit 412 receives a frame, the transfer device 11*a* may extract the class information on the basis of the identification number of the received frame and the table of the identification numbers of frames and the class information of each of the frames. The transfer device 11a can also transmit the class information to the class extraction unit 412 by storing the class information of each of frames in a queue in the order, instead of including the table of the identification numbers of frames and the class information of each of the frames. A unit that assigns an identification number to each frame is an example of an assigning unit. The table of the identification numbers of frames and the class information of each of the frames or a queue in which the class information of each frame is stored is an example of a binding unit. Also the transfer device 11a configured in this manner can achieve the effects of the first embodiment described above.

In the transfer device 11a according to the first embodiment described above, frames are allocated to the store-and-forward path of the low-latency class and to the store-and-forward path of the general class using the SMD values of the frames received by the coupling processing unit 61. However, frames may be also allocated to the store-and-forward path of the low-latency class and to the store-and-forward path of the general class on the basis of the classes identified according to the result of the class table. Also the transfer device 11a configured in this manner can achieve the effects of the first embodiment described above.

Second Embodiment

In the first embodiment, the reception units 31a to 34a store the class information in a received frame on the basis of the storage information of the received frame and transmit the frame, so that the transmission units 41a and 42a identify the class information of the frame. In a second embodiment, the class information of a received frame is transmitted in parallel to the frame. Accordingly, the effects of the first embodiment described above can be obtained. Other than this, the second embodiment is identical to the first embodiment. In the following descriptions, the configurations and operations described above are denoted by the same reference signs and redundant explanations thereof are omitted.

An operation of the reception unit 31a of the transfer device 11a is described.

The class information of a frame is input from the class identification unit 312a to the allocation unit 314a. At the time of transfer of the frame, the allocation unit 314a does not assign the frame with the class information and the output port information for the target frame. The allocation unit 314a transmits the received frame and a pulse signal indicating the class information received from the class identification unit 312a. The pulse signal is an example of parallel information. After transmitted from the allocation unit 314a, the pulse signal indicating the class information is transmitted to a transmission unit via a coupling processing unit, a switching processing unit, a cut-through storage unit, and a store-and-forward storage unit. Operations of the allocation unit 314a of the reception unit 32a and the allocation units 314b of the reception units 33a and 34a are identical to those of the allocation unit 314a of the reception unit 31a.

Figure 18:
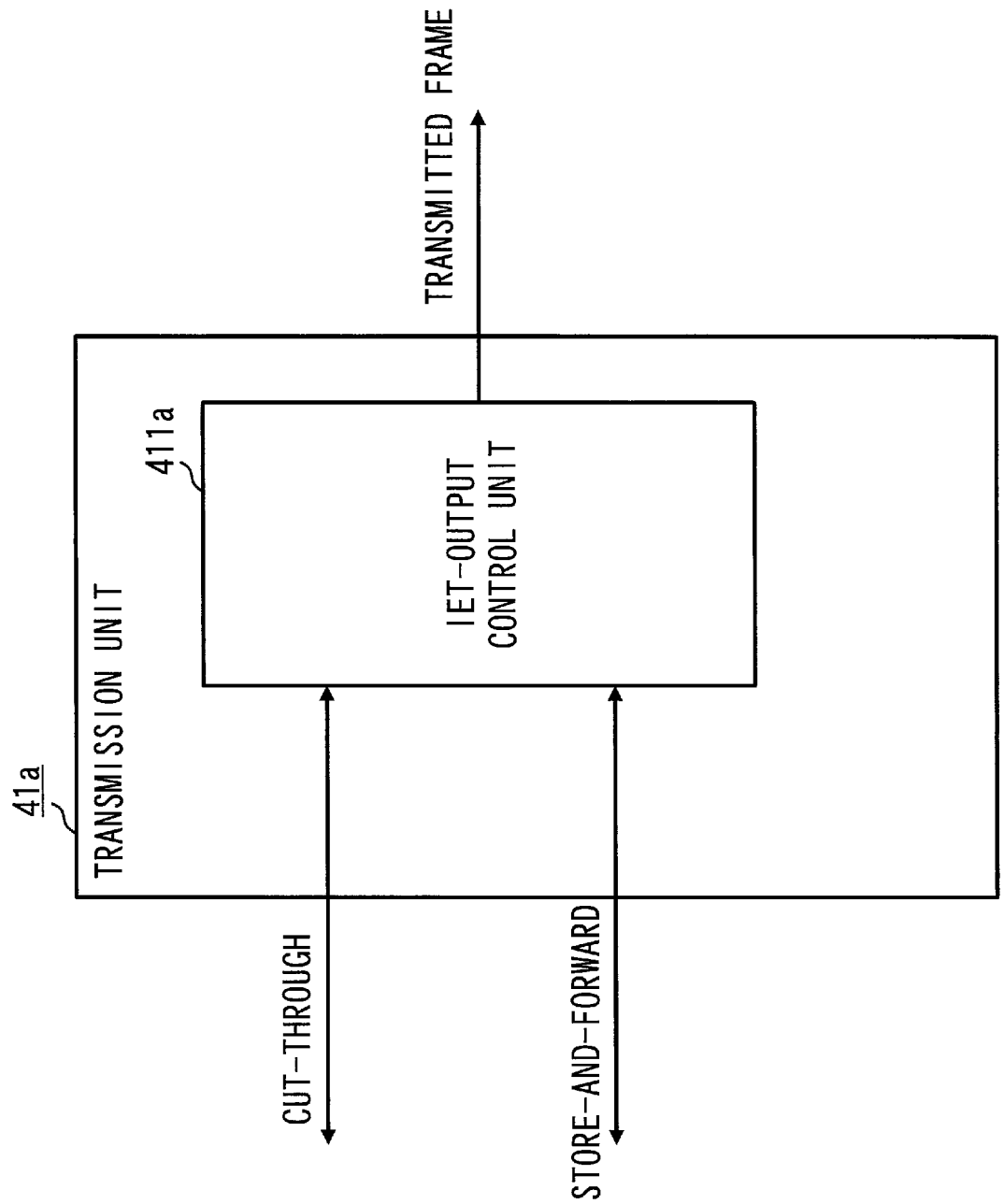
FIG. 18 is a functional block diagram of a transmission unit of a transfer device according to a second embodiment of the present invention.

FIG. 18 is a functional block diagram of the transmission unit 41a in the transfer device 11a according to the second embodiment of the present invention.

The IET-output control unit 411a receives the pulse signal indicating the class information of a frame instead of receiving the class information from the class extraction unit 412.

Figure 19:
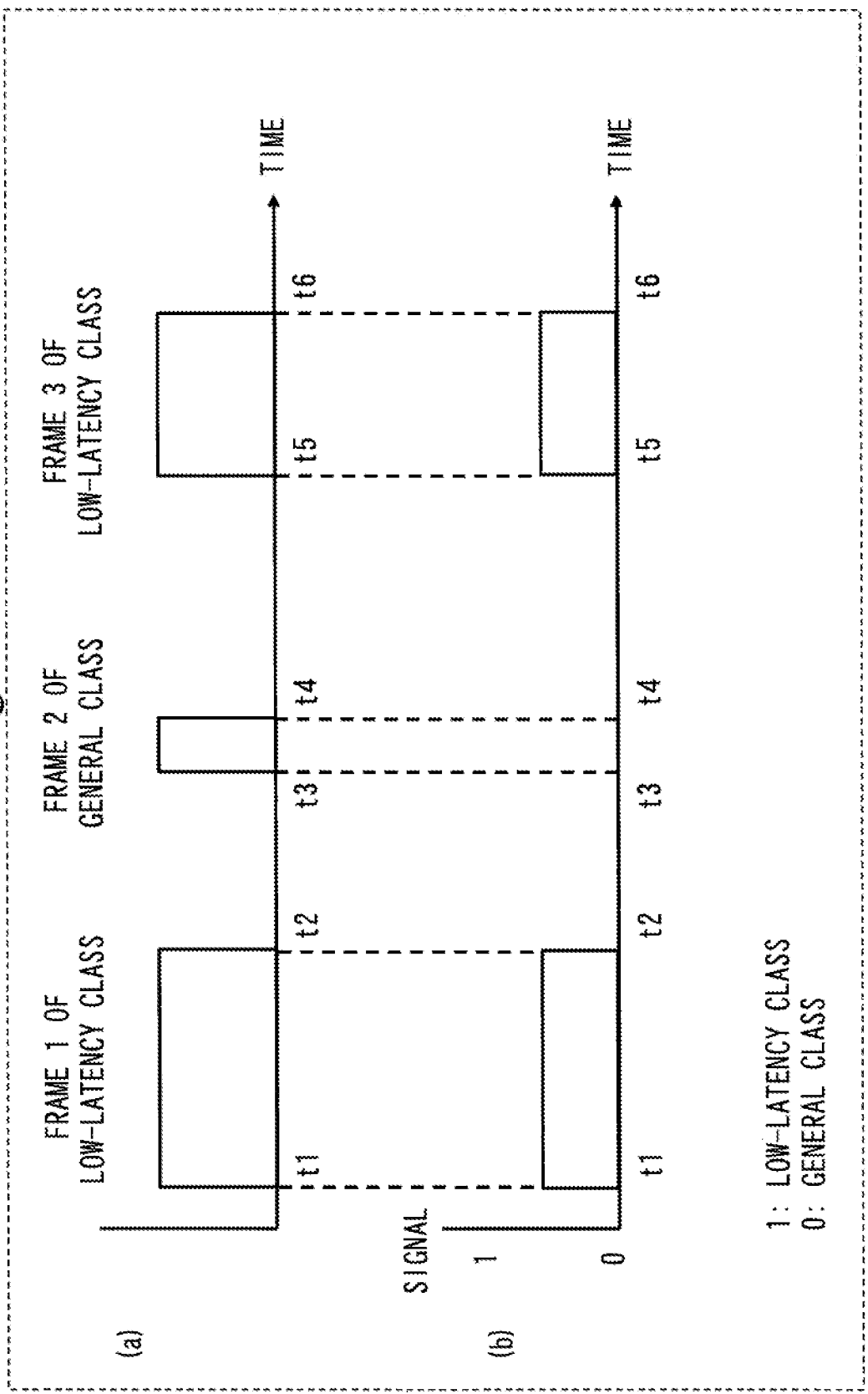
FIG. 19 are diagrams illustrating an example in which class information of identified frames is transmitted to an allocation unit as a pulse signal, where (a) is a diagram illustrating a relation between frames to be transmitted and a time and (b) is a diagram illustrating a relation between signal values of class information of frames and a time.

FIG. 19 are diagrams illustrating an example in which the allocation unit 314a transmits the class information of frames as the pulse signal.

FIG. 19 are diagrams illustrating a relation between frames to be transmitted and the class information of the frames to be transmitted in parallel with the frames. FIG. 19(a) is a diagram illustrating, a relation between frames to be transmitted and time. FIG. 19(b) is a diagram illustrating a relation between signal values of the class information of frames and time.

It is assumed that the reception unit 31a receives a frame 1 of the low-latency class, a frame 2 of the general class, and a frame 3 of the low-latency class. When the class information of each of the frames is input from the class identification unit 312a, the allocation unit 314a transmits the frames as illustrated in FIG. 19(a) and transmits the pulse signals as illustrated in FIG. 19(b). The pulse signal indicates the low-latency class when it is "1", and indicates the general class when it is "0". For example, at times t1 to t2, the allocation unit 314a transmits the frame 1 of the low-latency class and transmits the pulse signal "1". As for the frame 2 of the general class, the allocation unit 314a transmits the frame 2 of the general class and transmits the pulse signal "0" at times t3 to t4.

While the pulse signal "1" indicates the low-latency class and the pulse signal "0" indicates the general class, the values can be freely selected. Further, signals other than the pulse signal can be used.

As described above, in the transfer device 11a according to the second embodiment, the allocation unit 314a creates the parallel information indicating the class information of an input frame and transmits the parallel information in parallel to the frame, and the IET-output control unit 411a acquires the class information from the parallel information. Therefore, effects identical to those of the first embodiment can be achieved without storing the class information in frames.

Third Embodiment

In the first embodiment, the IET-output control unit 411a provides SMD-E as the SMD value of each frame of the low-latency class no matter whether frames are to be transferred by cut-through or frames are to be transferred by store-and-forward. An embodiment in which SMD-E is provided as the SMD value of each frame of the low-latency class to be transferred by cut-through and SMD-S is provided as the SMD value of each frame of the low-latency class to be transferred by store-and-forward is described. In the following descriptions, the configurations and operations described above are denoted by the same reference signs and redundant explanations thereof are omitted.

Figure 20:
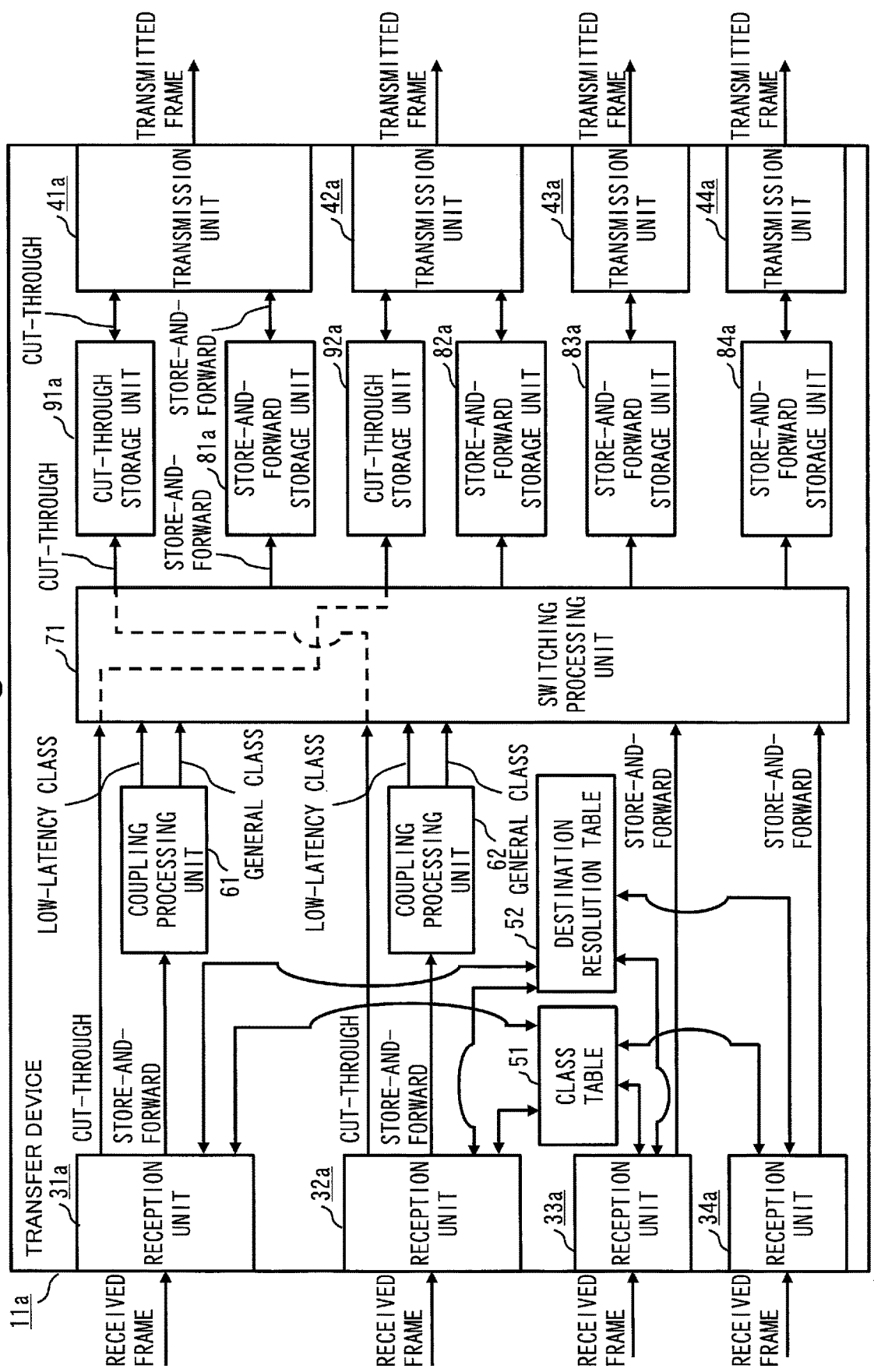
FIG. 20 is a functional block diagram of a transfer device according to a third embodiment of the present invention.

FIG. 20 is a functional block diagram of the transfer device 11a according to a third embodiment of the present invention. The difference from the first embodiment is that the reception units 31a and 32a refer to the class table 51.

Figure 21:
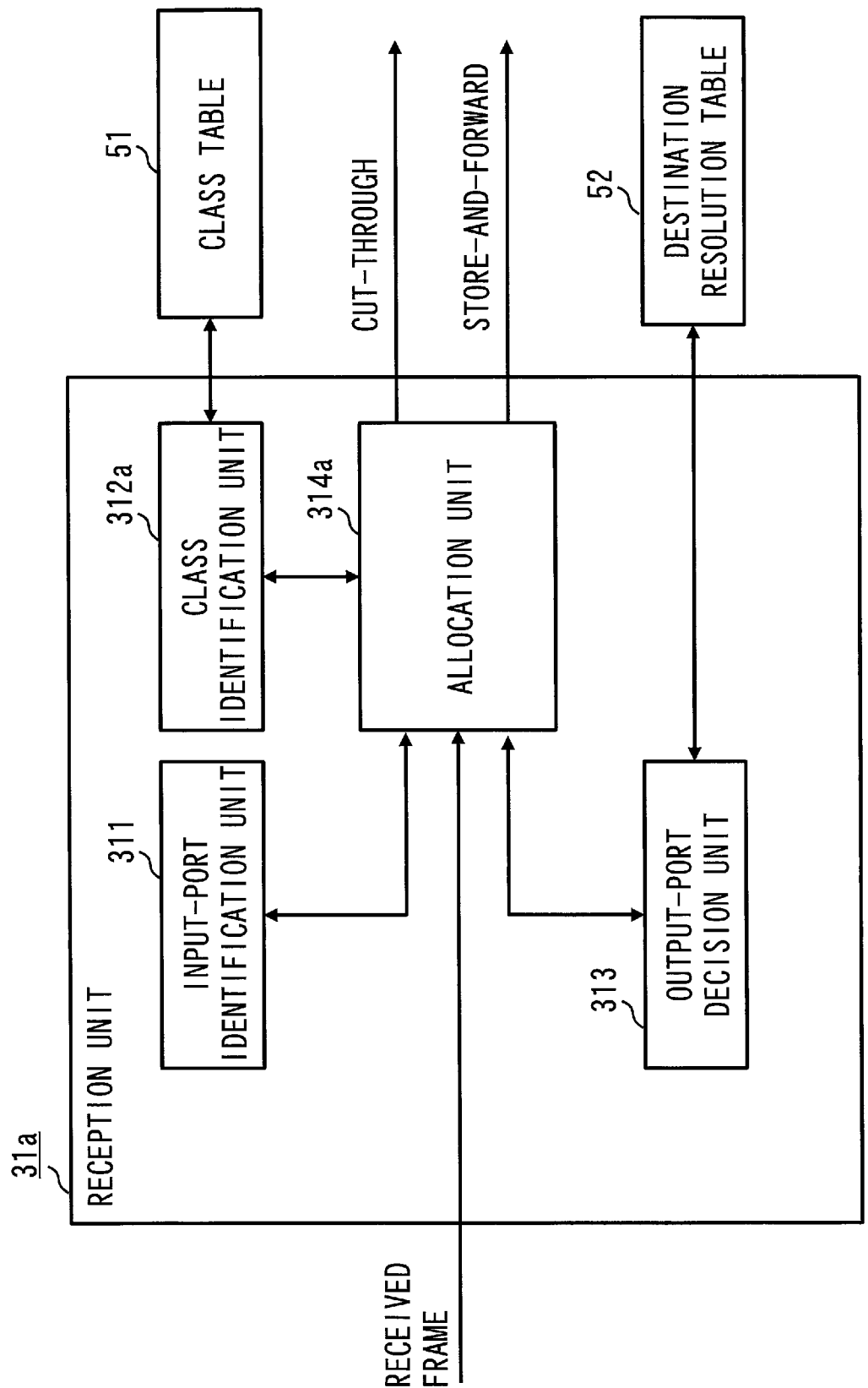
FIG. 21 is a functional block diagram of a reception unit of the transfer device according to the third embodiment.

FIG. 21 is a functional block diagram of the reception unit 31a in the transfer device 11a according to the third embodiment. The difference from the first embodiment is that the class identification unit 312a refers to the class table 51.

An operation of the transfer device 11a according to the third embodiment of the present invention is explained next.

Figure 22:
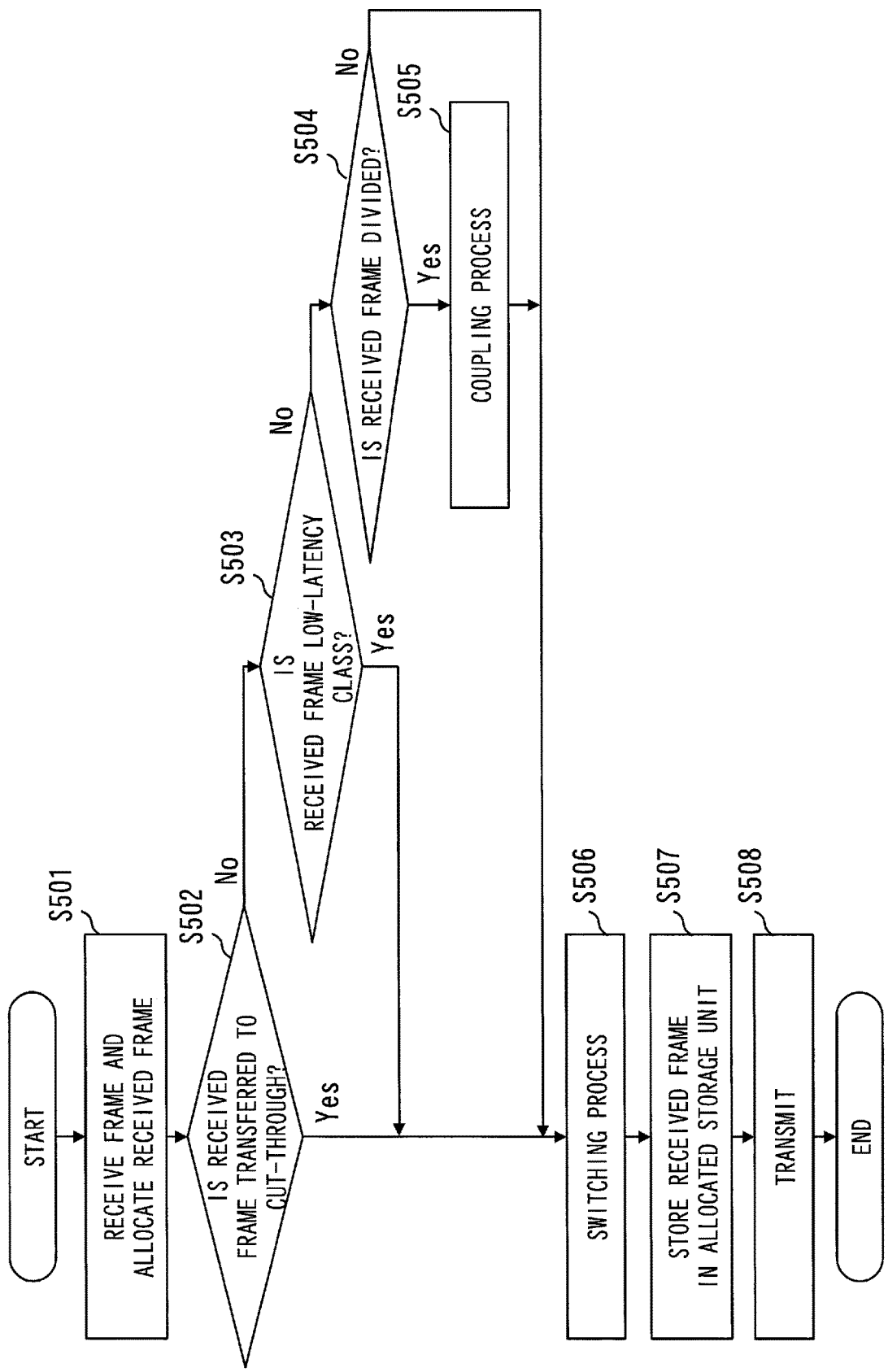
FIG. 22 is a flowchart illustrating an operation of the transfer device according to the third embodiment of the present invention.

FIG. 22 is a flowchart illustrating an operation of the transfer device 11a according to the third embodiment of the present invention.

Steps S501 and S502 are identical to Steps S101 and S102 in the first embodiment.

In Step S503, the coupling processing unit 61 receives the frame from the reception unit 31a through the store-and-forward path. When the received frame is a frame of the low-latency class (Step S503: Yes), the coupling processing unit 61 transfers the frame as it is through the store-and-forward path of the low-latency class. When Step S503: No is obtained and the received frame is not a frame of the low-latency class, the process proceeds to Step S504.

Steps S504 to S507 are identical to Steps S104 to S107 in the first embodiment. Step S508 is described later.

Figure 23:
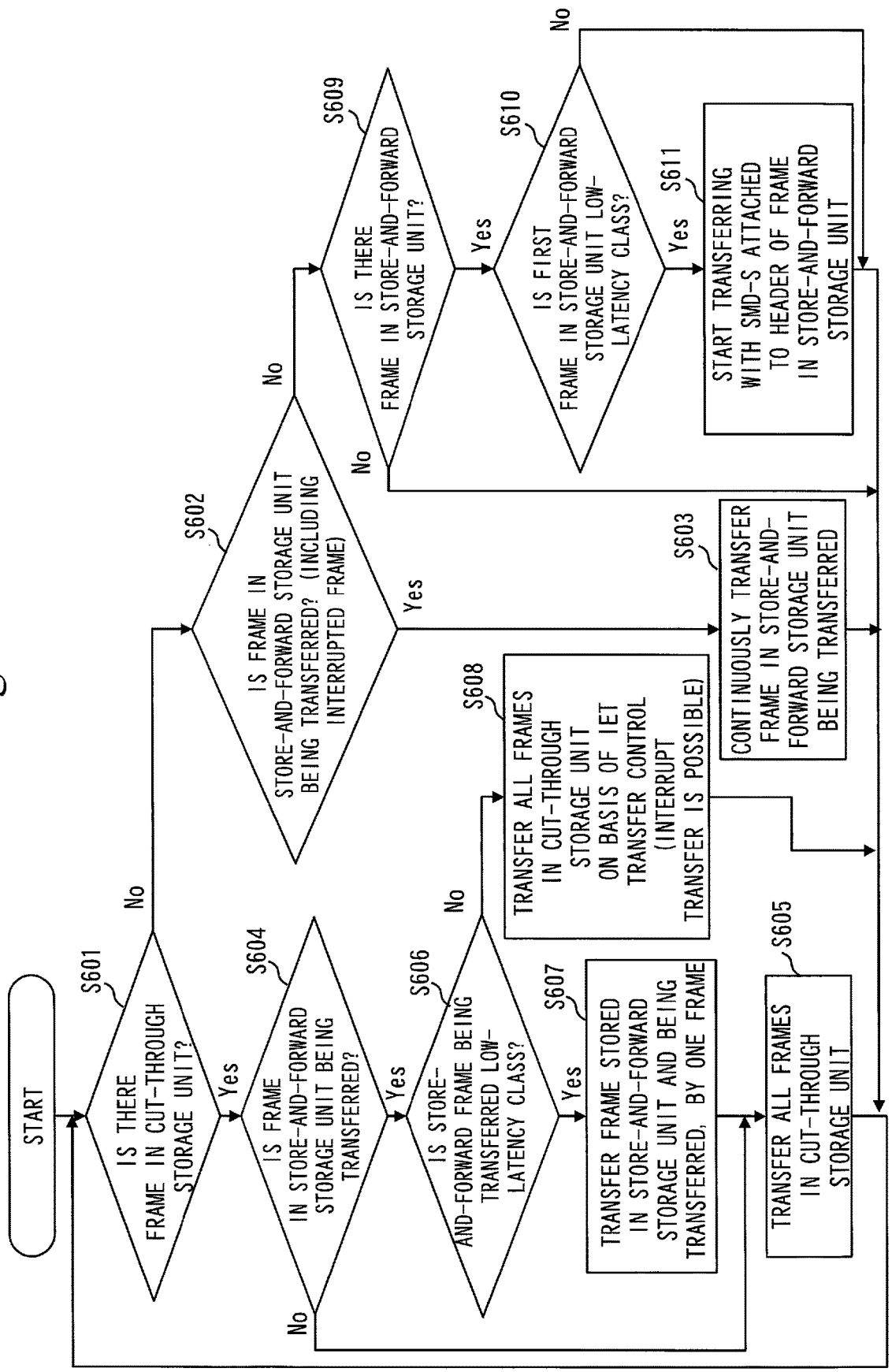
FIG. 23 is a flowchart illustrating an operation of an IET-output control unit of a transmission unit of the transfer device according to the third embodiment of the present invention.

FIG. 23 is a flowchart illustrating an operation of the transmission unit 41a of the transfer device 11a according to the third embodiment of the present invention. An operation in Step S508 in FIG. 22 is explained with reference to FIG. 23.

Steps S601 to S609 are identical to Steps S401 to S409 in FIG. 17 in the first embodiment.

In Step S610, when the IET-output control unit 411a determines that a frame that is stored in the store-and-forward storage unit 81a and that is to be transferred first is the low-latency class, Step S610: Yes is obtained and the process proceeds to Step S611. In Step S611, the IET-output control unit 411a transmits a transmission permission to the store-and-forward storage unit 81a and receives a frame from the store-and-forward storage unit 81a. The IET-output control unit 411a provides SMD-S as the SMD value in the header of the received frame and transfers a predetermined number of bytes of the received frame to the terminal device 21. The predetermined number of bytes is, for example, 1 byte, 2 bytes or the like and is a period with which whether a frame has arrived at the cut-through storage unit 91a is checked. Transfer of the frame is started. After Step S611, the process returns to Step S601.

In Step S610, when the IET-output control unit 411a determines that a frame stored in the store-and-forward storage unit 81a and to be transferred first is not the low-latency class, Step S610: No is obtained and the process returns to Step S601.

The transfer devices and the transfer methods illustrated in the embodiments described above are only examples. The transfer devices and the transfer methods can be combined as appropriate and are not limited only to the configurations of the embodiments. The class information of a received frame can be transmitted in parallel to the frame as in the second embodiment.

As described above, in the transfer device 11a of the first embodiment, when outputting a frame that is the low-latency class and that is decided to be transferred by store-and-forward, the IET-output control unit 411a outputs the frame while the SMD value of the frame is set as SMD-S indicating the general class and information designating a class indicating a priority different from the SMD value as the low-latency class is stored in the frame. Therefore, if the transfer device 12a has a class table identical to the class table in the transfer device 11a and identifies the class from the information stored in the "data" of the frame, instead of the SMD value, the frame is identified as a frame of the low-latency class after being transferred to the transfer device 12a and can be transferred by cut-through, even if "SMD-S" is set as the "SMD value" in the frame.

REFERENCE SIGNS LIST

1: transfer system; 11a, 12a: transfer device; 21 to 26: terminal device: 101 to 104: port; 31a to 34a: reception unit; 41a to 44a: transmission unit; 51: class table; 52: destination resolution table; 61 to 64: coupling processing unit; 71: switching processing unit; 81a to 84a: store-and-forward storage unit; 91a to 92a: cut-through storage unit; 111: bus; 112: input/output IF; 113: memory; 114: storage medium; 115: CPU; 116: processing circuit; 311: input-port identification unit; 312a to 312b: class identification unit; 313: output-port decision unit; 314a to 314b: allocation unit; 411a: IET-output control unit; 411b: output control unit; 412: class extraction unit

The invention claimed is:

1. A transfer device comprising:
a plurality of input ports;
a plurality of output ports; and
processing circuitry configured to:
    manage, as a managed input port, a predetermined input port among the plurality of input ports, the predetermined input port supporting a cut-through method, and being associated in advance with a single output port, among the plurality of output ports, for supporting the cut-through method, and when an Interspersing Express Traffic (IET) frame is received from the managed input port, decide whether or not to transfer the received frame by the cut-through method, based on both type information identifying a type of the managed input port of the received frame and type information identifying a type of the received frame,
    when it is decided that the received frame is to be transferred by the cut-through method, transfer the received frame to a corresponding output port, which is the output port associated in advance with the managed input port, using a cut-through path which supports the cut-through method and which is set in advance as a pathway between the managed input port and the corresponding output port, among a plurality of pathways between the plurality of input ports and the plurality of output ports, and
    manage the corresponding output port as a managed output port, and when the received frame has been transferred via the cut-through path, transmit the received frame from the managed output port by the cut-through method,
wherein the type information identifying the type of the managed input port includes at least one of IET-correspondence existence information, an input port number of the managed input port, and connected device information describing a device connected to the managed input port.

2. The transfer device according to claim 1,
wherein the processing circuitry decides that the received frame is to be transferred by the cut-through method when the received frame is a frame of a low-latency class for which low-latency transfer is required.

3. The transfer device according to claim 1,
wherein the processing circuitry may transfer a frame using a store-and-forward path which is a pathway supporting a store-and-forward method, among the plurality of pathways between the plurality of input ports and the plurality of output ports, and
wherein the processing circuitry manages, as the managed output port, the corresponding output port supporting the cut-through method and the store-and-forward method, and when a frame has been transferred via the store-and-forward path, determines a type of the frame transferred via the store-and-forward path, and when the frame is a frame of a low-latency class for which low-latency transfer is required, transmits the frame by the store-and-forward method from the managed output port without dividing the frame, and when the fame is a frame of a general class which is not the low-latency class, decides whether or not to divide the frame, and when it is decided that the frame of the general class is to be divided, divides the frame of the general class and transmits divided frames obtained as a result of dividing the frame by the store-and-forward method.

4. The transfer device according to claim 1,
wherein, the processing circuitry manages, as a store-and-forward managed input port, a predetermined input port not supporting the cut-through method but supporting the store-and-forward method among the plurality of input ports,
wherein the processing circuitry manages, as a store-and-forward managed output port, a predetermined output port not supporting the cut-through method but supporting the store-and-forward method among the plurality of output ports, and
wherein the processing circuitry transfers a frame received, using a store-and-forward path which is a pathway supporting the store-and-forward method between the store-and-forward managed input port and the store-and-forward managed output port, among the plurality of pathways between the plurality of input ports and the plurality of output ports.

5. A transfer method executed by a computer having a plurality of input ports and a plurality of output ports, the transfer method comprising:
managing, as a managed input port, a predetermined input port among the plurality of input ports, the predetermined input port supporting a cut-through method, and being associated in advance with a single output port, among the plurality of output ports, for supporting the cut-through method, and when an Interspersing Express Traffic (IET) frame is received from the managed input port, deciding whether or not to transfer the received frame by the cut-through method, based on both type information identifying a type of the managed input port of the received frame and type information identifying a type of the received frame;
transferring, when it is decided that the received frame is to be transferred by the cut-through method, the received frame to a corresponding output port, which is the output port associated in advance with the managed input port, using a cut-through path which supports the cut-through method and which is set in advance as a pathway between the managed input port and the corresponding output port, among a plurality of pathways between the plurality of input ports and the plurality of output ports; and
managing the corresponding output port as a managed output port, and when the received frame has been transferred via the cut-through path, transmitting the received frame from the managed output port by the cut-through method,
wherein the type information identifying the type of the managed input port includes at least one of IET-correspondence existence information, an input port number of the managed input port, and connected device information describing a device connected to the managed input port.

6. A transfer system comprising a plurality of transfer devices, each of the plurality of transfer devices including:
a plurality of input ports;
a plurality of output ports; and
processing circuitry to
manage, as a managed input port, a predetermined input port among the plurality of input ports, the predetermined input port supporting a cut-through method, and being associated in advance with a single output port, among the plurality of output ports, for supporting the cut-through method, and when an Interspersing Express Traffic (IET) frame is received from the managed input port, decide whether or not to transfer the received frame by the cut-through method, based on both type information identifying a type of the managed input port of the received frame and type information identifying a type of the received frame,
when it is decided that the received frame is to be transferred by the cut-through method, transfer the received frame to a corresponding output port, which is the output port associated in advance with the managed input port, using a cut-through path which supports the cut-through method and which is set in advance as a pathway between the managed input port and the corresponding output port, among a plurality of pathways between the plurality of input ports and the plurality of output ports, and
manage the corresponding output port as a managed output port, and when the received frame has been transferred via the cut-through path, transmit the received frame from the managed output port by the cut-through method,
wherein the type information identifying the type of the managed input port includes at least one of IET-correspondence existence information, an input port number of the managed input port, and connected device information describing a device connected to the managed input port.

* * * * *